United States Patent
Honda et al.

[11] Patent Number: 5,851,643
[45] Date of Patent: Dec. 22, 1998

[54] MAGNETIC RECORDING MEDIA AND MAGNETIC RECORDING READ-BACK SYSTEM WHICH USES SUCH MEDIA

[75] Inventors: Yukio Honda, Fuchuu; Nobuyuki Inaba, Hasuda; Mikio Suzuki, Kokubunji; Masaaki Futamoto, Tukui-gun; Hiroyuki Awano, Nagareyama; Yoshibumi Matsuda, Odawara; Yoshihiro Shiroishi, Hachiouji, all of Japan

[73] Assignee: Hitachi, Ltd., Tokyo, Japan

[21] Appl. No.: 832,330

[22] Filed: Mar. 26, 1997

Related U.S. Application Data

[63] Continuation of Ser. No. 336,882, Nov. 9, 1994, abandoned.

[30] Foreign Application Priority Data

| Nov. 11, 1993 | [JP] | Japan | 5-282385 |
| Nov. 12, 1993 | [JP] | Japan | 5-283052 |
| Dec. 17, 1993 | [JP] | Japan | 5-318166 |

[51] Int. Cl.$^6$ .................................................. G11B 5/66
[52] U.S. Cl. .................. 428/212; 428/213; 428/216; 428/336; 428/611; 428/635; 428/641; 428/660; 428/662; 428/663; 428/665; 428/666; 428/670; 428/678; 428/694 TM; 428/694 TS; 428/900; 428/928; 360/97.01
[58] Field of Search ..................................... 428/212, 213, 428/216, 336, 611, 635, 641, 660, 662, 663, 665, 666, 670, 678, 694 TM, 694 TS, 900, 928; 360/97.01

[56] References Cited

U.S. PATENT DOCUMENTS

| 4,621,030 | 11/1986 | Uesaka et al. | 428/607 |
| 4,677,032 | 6/1987 | Robinson | 428/611 |
| 4,687,712 | 8/1987 | Sugita et al. | 428/611 |
| 4,992,336 | 2/1991 | Yamamoto et al. | 428/635 |
| 5,176,965 | 1/1993 | Mallary | 428/694 |
| 5,227,212 | 7/1993 | Ahlert et al. | 360/97.01 |
| 5,344,706 | 9/1994 | Lambeth et al. | 428/336 |
| 5,370,928 | 12/1994 | Funabashi et al. | 428/336 |
| 5,391,431 | 2/1995 | Kudoh et al. | 428/336 |
| 5,407,755 | 4/1995 | Brucker et al. | 428/635 |
| 5,432,012 | 7/1995 | Lal et al. | 428/610 |

FOREIGN PATENT DOCUMENTS 63-197018 8/1988 Japan .

OTHER PUBLICATIONS

S. Iwasaki et al., "Perpendicular Magnetic Recording With A Composite Anisotropy Film", *IEEE Transactions on Magnetics,* vol. MAG–15, No. 6, Nov. 1979, pp. 1456–1458.

*Primary Examiner*—Stevan A. Resan
*Attorney, Agent, or Firm*—Michaelson & Wallace; Peter L. Michaelson; John C. Pokotylo

[57] ABSTRACT

A magnetic recording media with a magnetic film made from at least two layers stacked via a non-magnetic intermediate layer, wherein the magnetic film is formed on a structure control underlayer situated on a non-magnetic substrate. A magnetic recording system is also disclosed which includes this magnetic recording media and a magnetic recording head for recording on and reading back from the magnetic recording media. The system further includes a disk drive system, which generates relative motion between the magnetic recording media and the magnetic recording head, and an actuator which determines an appropriate location, on the magnetic recording media, over which the head should be located.

61 Claims, 10 Drawing Sheets

MAGNETIC RECORDING MEDIA AND MAGNETIC RECORDING READ-BACK SYSTEM WHICH USES SUCH MEDIA

CROSS REFERENCE TO RELATED APPLICATION

This application is a continuation of copending patent application serial number 08/336,882, filed Nov. 9, 1994 now abandoned entitled Magnetic Recording Media and Magnetic Recording Read-Back System Which Uses Such Media.

BACKGROUND OF THE INVENTION

This invention relates to a magnetic recording system which uses magnetic recording media suitable for high-density magnetic recording.

Magnetic recording currently in practical use employs longitudinal magnetic recording methods which magnetize a magnetic recording media in a direction parallel to its surface so that the N (north) pole and the S (south) pole may face each other. Though generally speaking, these methods should be effective for future multiple Giga-bit ($Gb/in^2$) order high-density magnetic recording, they do present various deficiencies.

Co-based alloy thin-films using, e.g., Co—Cr, Co—Ni, and the like are used as magnetic thin-film for longitudinal magnetic recording. Among these alloys with Co—Cr as the main component, Ta, Pt, Mo, Ru, Re or Fe are added. These Co-based alloys which compose magnetic thin-films for longitudinal magnetic recording have a hexagonal close packed (hcp) lattice structure; with a c-axis of this crystal having a magnetically easy axis in the <001> direction. The currently used magnetic recording media are the previously mentioned Co-based alloy thin-films formed on non-magnetic substrates such an Al substrate coated with NiP, a glass plate, or plastic films such as polyimide, or polyethylene terephthalate.

However, for Co-based alloy thin-film formed directly on non-magnetic substrates, the c-axes which are axes of easy magnetization are totally irregular, the magnetic thin-film coercivity is limited at less than 1000 Oe (oersted), and thus performance as a medium for high-density magnetic recording is insufficient. Therefore, with the goal of providing a high orientation within the substrate surface to the Co-based alloy thin-film crystal c-axis which is the above mentioned magnetic layer, we have proposed previously a method of forming a Cr underlayer, with a body centered cubic (bcc) lattice structure on the substrate, and a Co-based alloy magnetic thin-film situated on top of the underlayer.

In recent years, a sudden increase in the volume of information and the necessity to downsize recording systems have led to a need to provide increasingly dense magnetic recording. However, as the recording density gets higher, recording area per bit gets smaller. As such, with a longitudinal magnetic recording medium using a thin-film, like the one described above, the size of the crystal grains becomes an important factor in determining a limit to recording density. Through Japanese published (Laid-Open) patent application 63-197018, we have taught a method to refine the crystal grains of the underlayer by using a Cr—Ti alloy underlayer in which Ti (which is difficult to mix with Cr) is added to Cr, and thus yield a longitudinal magnetic recording medium with smaller crystal grains in the recording layer.

To provide proper magnetic orientation, the art describes a method in which texture grooves are used and the magnetic anisotropy of the thin-film is controlled along the same direction as well as orthogonally to these grooves.

Read-back signal media noise closely depends upon the structure of a magnetic recording pattern boundary (magnetic transition region). Additionally, media noise is also influenced by the strength of magnetic exchange interaction between particles which make up the magnetic thin-film and magnetic anisotropy diffusion. Various methods have been employed to decrease media noise, among them are: (1) a method which increases the non-magnetic Cr in CoCr alloys, segregates supersaturated Cr on the crystal grain field, and thus decreases the magnetic exchange interaction between magnetic particles; and (2) another method which isolates the underlayer for production control, by controlling sputtering gas pressure, and decreases the interaction between magnetic particles formed over the underlayer.

Further, with the goal of decreasing media noise, to decrease the magnetic exchange interaction between magnetic particles in the film thickness direction rather than the planar direction of the magnetic thin-film, we have also previously proposed various methods such as placing a non-magnetic intermediate layer such as Cr between CoCr alloy magnetic thin-films. However, if a non-magnetic layer is merely placed between magnetic thin-films, the resulting coercivity will only be 1300 to 1500 Oe which is comparable to that which can be obtained by the same thickness of a single-layer magnetic thin-film.

To raise the recording density for longitudinal magnetic recording, it is necessary to reduce the thickness of the magnetic thin-film on the recording medium and to increase coercivity, thereby reducing the effect of the demagnetizing field during recording. It is also necessary to orient the magnetically easy axis of the magnetic thin-film parallel to the substrate surface. Preferably, the magnetically easy axis should be oriented in a consistent direction.

However, with longitudinal magnetic recording, a zigzag structure magnetic domain is formed essentially at a boundary of a recording bit; thus, compounding the problem of improving recording density and decreasing read-back noise.

On the other hand, a perpendicular magnetic recording method forms a magnetic domain in a direction perpendicular to the surface of the magnetic recording media. Through this method, adjacent recording bits are aligned anti-parallel to each other. Furthermore, perpendicular magnetic recording is suitable for improving magnetic recording density inasmuch as a demagnetizing field of each recording bit boundary is relatively small for high-density recording. As such, during recording, the boundary forms a clearly demarcated magnetic domain. Thus, this method is also effective for future multiple $Gb/in^2$ order high-density magnetic recording.

Co-based alloy thin-films with a Co component such as CoCr, Co—V, Co—Mo, CoCrTa, Co—CoO, CoCrRh and the like, are used as the main component of magnetic recording media for perpendicular magnetic recording. These Co-based alloys which form magnetic thin-films have an hcp structure with the c-axis of their crystals having a magnetically easy axis in the <00·1> direction. When such a magnetic thin-film is formed by vacuum evaporation or sputtering, the fine crystal grains which form the thin-film are easily oriented with this c-axis parallel to the substrate surface. To improve magnetic recording characteristics of these thin-films, such as by increasing recording density or read-back output or by reducing read-back noise, it is necessary to improve the c-axis orientation of these Co-based alloy thin-films as well as to control the diameter of the crystal grain size.

Conventionally used perpendicular magnetic recording media have Co-based alloy thin-films formed directly on non-magnetic substrates, such as an NiP coated Al substrate, a glass plate, or plastic films such as polyimide or polyethylene terephthalate. However, the Co-based alloy thin-film formed directly on the non-magnetic substrate has a completely inconsistent c-axis (which is the magnetically easy axis), inconsistent crystal grain size and relatively small coercivity, such as less than 1000 Oe. Consequently, the performance characteristics of such a thin-film as a high-density magnetic recording medium are not good.

In "Perpendicular Magnetic Recording with Composite Anisotropy Film", *IEEE Trans. Magnetics*, Vol. MAG-15, No. 6, Nov. 1979, pages 1456–1458, a method is described in which a soft magnetic thin-film, such as permalloy, is used in a lower portion of Co-based alloy thin-film to increase magnetic recording read-back efficiency.

On the other hand, with the goal of highly orienting the c-axis of the crystalline grains in the Co-based alloy thin-film, which is the magnetic layer, in a direction perpendicular to the substrate surface, we have previously proposed a method by which an underlayer with a Ti hcp structure or an underlayer with an Si or Ge amorphous structure is formed on the substrate, and a Co-based alloy thin-film is then formed on top of this underlayer. Doing so improves the c-axis orientation of the magnetic crystal grains, thus realizing high recording densities.

However, to implement high-density magnetic recording above multiple $Gb/in^2$ and besides merely increasing the recording density of the media itself, noise appearing in the read-back signals, especially media noise caused by the fine structure of the magnetic thin-film, must also be reduced. To do this, it is necessary to control the crystal orientation of the magnetic thin-film as well as to more closely control the thin-film structure itself.

The media noise of the read-back signal is very closely related to the structure of the magnetic recording pattern, and is largely influenced by the magnetic exchange interaction strength between particles, which form the magnetic film, and dispersion of magnetic anisotropy. Previously, various improvements for reducing media noise have been tried. For example, one such method relies on increasing the non-magnetic Cr in CoCr alloys, and segregating the supersaturated Cr on the crystal grain field; while another method relies on isolating the underlayer for production control by controlling the sputtering gas pressure, and decreasing the interaction between magnetic particles formed on this underlayer.

To further reduce media noise, we have previously proposed placing a non-magnetic intermediate layer such as Cr between CoCr alloy magnetic thin-films. Doing so decreased the magnetic exchange interaction between magnetic particles in the film thickness direction rather than in the planar direction of the magnetic thin-film. However, if such a non-magnetic intermediate layer is conventionally placed between magnetic thin-films, a severe decrease in coercivity, as compared to a single-layer magnetic thin-film of the same thickness, results.

For ultra high-density magnetic recording of over 1 $Gb/in^2$, the recording bit length is small at approximately 0.2 $\mu m$. Consequently, to implement stable high-density recording wherein the demagnetizing field at the time of longitudinal recording has a reduced influence, the magnetic thin-film thickness should be 30 nm or less, and the thin-film should have a coercivity in the longitudinal direction of the media of 2000 Oe or more.

Prior magnetic recording media also employed a base of CoCr alloy with Pt, Ta, or W added, and a thin layer grown epitaxially on the aforementioned Cr underlayer. However, high coercivity of 2000 Oe or more could not be obtained for these media at a magnetic thin-film thickness of 30 nm or less. Therefore, it was not possible to implement a highly dense magnetic recording on these media with good reproducibility and low read-back noise. With the goal of reducing read-back noise, proposals exist for adding a non-magnetic intermediate layer such as Cr, between the aforementioned magnetic thin-films on these media. Unfortunately, a severe reduction occurred in the coercivity, to about 1300 to 1500 Oe, for the resulting thin-films, wherein the total magnetic thin-film thickness in the ensuing media is 30 nm or less.

To make a Cr—Ti alloy thin-film as described above using sputtering, an alloy target is required that has the same basic composition as the resulting thin-film. Unfortunately, those elements that effectively improve recording characteristics are difficult to mix with Cr, thus presenting difficulties in producing alloy targets with a uniform composition.

SUMMARY OF THE INVENTION

This invention, has as its subject, to advantageously eliminate the above-discussed problems of the prior art, by providing longitudinal magnetic recording media, and a magnetic recording system which uses it. This media, being suitable for ultra high-density magnetic recording, has desirable magnetic characteristics, such as a magnetic thin-film thickness of 30 nm or less and high coercivity of 2000 Oe or above as well as excellent low-noise characteristics.

The present invention, also has as its object, to eliminate the aforementioned problems of the prior art, by providing a perpendicular magnetic recording media, and a magnetic recording system which uses it, wherein this media is also suitable for ultra high-density magnetic recording and the system controls the fine magnetic domain structure during recording. By appropriately controlling the crystal orientation and magnetic anisotropy or interaction between magnetic particles of a Co-based alloy thin-film as this thin-film is formed on the substrate, the inventive media exhibits excellent low-noise characteristics.

In addition, the invention has a further object to implement a longitudinal magnetic recording media having an underlayer, which exhibits crystal grain refinement, for the Co-based alloy magnetic thin-film recording layer, wherein the refinement is the same or higher than that conventionally occurring. Our invention provides, through use of our inventive media, a magnetic recording system which has higher recording density characteristics than those in conventional systems heretofore taught in the art.

Through our inventive teachings, a magnetic recording media suitable for ultra high-density recording having a coercivity of 2000 Oe or more for a total magnetic thin-film thickness of less than 30 nm is obtained. This media is fabricated by: (a) forming a thin-film structure control, i.e., crystal growth control, layer on a substrate, (b) placing a non-magnetic layer over the structure control layer, and (c) epitaxially forming a stacked magnetic film, on the non-magnetic layer, structured so that the stacked film is constituted by layering compositionally different magnetic thin-films (magnetic layers).

For the structure control underlayer, a material, typically an alloy, with good consistency for both the magnetic thin-film and crystal lattice formed on this layer is used. Such an alloy material is selected which includes, for example, Cr with V, Ti, Ru, or Co. Most typically, a Cr-based underlayer with body centered cubic (bcc) structure is formed on the substrate, and a Co-based alloy thin-film is formed on the underlayer. To longitudinally orient the c-axis of this Co-based alloy thin-film, a <100> or <110> orientation Cr-based underlayer is preferable.

As a magnetic thin-film suitable for high-density magnetic recording, the magnetically easy axis, i.e., the c-axis, of the thin-film is oriented parallel to the substrate surface. Since each magnetic particle should preferably be magnetically isolated, each individual magnetic crystal should preferably be formed on the individual crystal grains which compose the structure control underlayer. As a medium for ultra high-density recording at bit densities of 1 Gb/in$^2$ and above, the magnetic thin-film particle size should be in the range of 10 to 50 nm, with the magnetic particles being isolated in the medium. To accomplish the latter, the crystal grain size of the alloy underlayer, of which Cr is the main component and which acts as the structure control underlayer of the thin-film, is distributed uniformly in the range of 10 to 50 nm with preferably axial orientations of <110> or <100>.

One major teaching of our invention is that a stacked magnetic film, which is to be formed of magnetic thin-films of at least two or more different compositions connected with each other at an interface and stacked, is epitaxially grown on the aforementioned structure control underlayer. The magnetic thin-film has Co as its main component and is formed from materials which include at least one element selected from a group consisting of Cr, Mo, V, Ta, Pt, Si, B, Ir, W, Hf, Nb, Ru, Ti, Ni and rare earth elements. The magnetic thin-film crystal lattice constant varies with composition, for example, when Pt is added to a CoCr alloy, depending on the volume added, the lattice constant varies from 1 to 3%. In other words, by connecting at the interface and epitaxially growing compositionally different (different lattice constant) magnetic thin-films, it is possible to improve the magnetic thin-film coercivity as a result of stress generated by the boundary. Consequently, coercivity of 2000 Oe or more can be obtained for stacked magnetic thin-films of thickness 30 nm or below and particularly for thicknesses of 15 nm or below.

Another major teaching of our invention is that the aforementioned stacked magnetic film can be itself stacked in multiple layers via intervening non-magnetic layers. This permits: (a) control over the strength of magnetic exchange interaction for the film thickness direction of the magnetic thin-film, and (b) reduction of read-back noise. Non-magnetic layers are formed by materials which include at least one of a group consisting of Cr, V, Ti, and Ru or from an alloy of these, for example, Cr, Cr—V alloy, Cr—Ti alloy, or Co—Cr (25% or more) alloy can be used. A suitable thickness, $t_{MD}$, for the magnetic layer is $0 \leq t_{MD} \leq 10$ nm. The same result occurs for non-magnetic layers formed of oxidation films or adsorptive films of a mono-atomic order. If a non-magnetic layer is a mono-atomic order film, then $t_{MD}$, in the above inequality, would be equal to zero. Further, to obtain low read-back noise characteristics, the thickness, $T_m$, of one layer of the aforementioned stacked magnetic film, should preferably be 30 nm or less, and even more preferably fall in the range of $5 \leq T_m \leq 30$ nm.

When forming a multi-layer magnetic recording media from stacked magnetic film, the stacked magnetic film is preferably formed from magnetic thin-films (magnetic layers) of different compositions. Specifically, a lattice constant difference, $\Delta L_1$, between a first magnetic thin-film on a near side to the substrate and the underlayer should exceed a lattice constant difference, $\Delta L_2$, between a second magnetic thin-film on a far side to the substrate and the underlayer, i.e., $\Delta L_2 > \Delta L_1$. However, a skew direction of the lattice constant in either the first or second magnetic thin-film is the same as that of the underlayer lattice constant. This allows good epitaxial crystal growth from the underlayer to the surface of the multi-layer stacked magnetic film, thus, yielding a magnetic recording media suitable for low-noise, high-density.

The ratio of thickness of upper and lower layers of the aforementioned stacked magnetic thin-film, formed by interfacing magnetic thin-films from at least two different compositions, can be set freely according to a specific purpose, with the stacked film thickness ratio being 1:1 as a standard. Coercivity of 2000 Oe or more can be obtained with the film thickness ratio ranging between 1:3 and 3:1. Also, the film thicknesses of the upper and lower layers of stacked magnetic thin-films can be changed through the non-magnetic layers. Furthermore, the coercivity of the upper layer can be set higher than that of the lower layer in order to set the saturation magnetization value of the former layer higher than that of latter.

Further, through our invention, by setting the underlayer which controls the magnetic thin-film crystal growth on the substrate or on the soft magnetic thin-film formed on the substrate; epitaxially stacking on this underlayer, a magnetic thin-film, in multiple layers via a non-magnetic intermediate layer, of the same composition or of two or more different compositions, and controlling the magnetic anisotropy of the stacked magnetic film, the above-described objects can be achieved.

For the stacked magnetic film, magnetic thin-films of two or more different compositions can be joined at a common interface thereof and stacked, or can be stacked in multiple layers via a non-magnetic intermediate layer.

Magnetic thin-films are formed from Co as a main component and materials which include at least one or more elements or compounds selected from a group consisting of Cr, Mo, V, Ta, Pt, Si, B, Ir, W, Hf, Nb, Ru, Ti, Ni, CoO and rare earth elements.

Structure control underlayers are formed from materials which can have a magnetic thin-film formed over it and good crystal lattice consistency, such as Ti, Ta, Ru, Hf, Co or hcp structure materials with Cr, V, or W added to these, or from amorphous materials such as Si or Ge. An underlayer can also be formed with Ti, Ta, Ru, Hf, or Co on an Si or Ge amorphous underlayer, or from an hcp structure underlayer with Cr, V, or W added to these.

Most typically, an hop structure underlayer is formed on a substrate, and a Co-based alloy magnetic thin-film is formed thereon. To orient the c-axis of this Co-based alloy thin-film in a perpendicular direction, an hcp underlayer with <00·2> orientation or an amorphous underlayer with Si or Ge as the main component is preferred.

By inclining an angle of incidence of evaporated grain when forming the thin-film, the magnetically easy axis of the magnetic thin-film can be inclined in a specific direction of the substrate surface. The angle of inclination of the magnetically easy axis from the direction perpendicular to the substrate surface is preferably in a range of 0 to 45 degrees in a direction along which the magnetic recording head travels.

The non-magnetic intermediate layer is composed of material which includes at least one of a group consisting of the following: Co, Ti, Ru, Hf, Ta, Cr, V, Ti, Ru, W, Mo, Pt, Si, Ge, or B, or from an alloy including these; with the material selected being one with an hcp structure which promotes magnetic thin-film epitaxial growth, a face centered cubic or body centered cubic structure, or an amorphous structure. A range of thickness of the non-metallic layer, $t_m$, of $0 < t_m \leq 8$ nm is suitable to control the strength of the magnetic exchange interaction along the thickness direction (width) of the magnetic thin-film layer.

To provide proper performance, a standard magnetic thin-film must obey the relationship, set forth in equations (relationships) (1) and (2) below, wherein $a_1$ and $a_2$ are axis lengths, i.e., lengths of a bottom side of a hexagon of a corresponding hcp structure crystal, of magnetic thin-film a located nearest the substrate and of magnetic thin-film b located farthest from the substrate, respectively, and $K_{ua}$ and $K_{ub}$ are corresponding magnetic anisotropy constants for thin-films a and b:

$$a_2 \geq a_1 \tag{1}$$

$$Ku_b \geq Ku_a \tag{2}$$

The stacked thin-film thickness ratio of the upper and lower layers of the stacked magnetic thin-film, formed by interfacing magnetic thin-films of two or more different compositions and stacking them, can be set freely for specified purposes. A coercivity of 2000 Oe or above can be obtained with a stacked film thickness ratio range of 1:3 to 3:1. The film thickness of stacked magnetic thin-films, formed with an intervening non-magnetic layer, can be changed by appropriately changing the thicknesses of the upper and lower layers. Such that the coercivity of the upper layer can be set higher than that of the lower layer and the saturation magnetization can be set to a high value.

With respect to a magnetization-magnetic field curve (M-H curve) in the magnetically easy axis direction of the aforementioned multi-layer magnetic recording media, equation (4) below relates saturation magnetization (Ms) and residual magnetization (Mr) to which demagnetizing field correction is not added to this latter. When normalized, the M-H curve of this thin-film should satisfy equation (5) below which relates a tangential line of the curve passing through magnetization zero and an angle (θ) formed by the magnetic field axis.

$$Mr/Ms \geq 0.8 \tag{4}$$

$$35° \leq \theta \leq 90° \tag{5}$$

For the aforementioned multi-layer thin-film magnetic recording media formed into multi-layers with a non-magnetic intermediate layer, equation (6), shown below, which relates the magnetic thin-film crystal grain size (d) to magnetic thin-film thickness (δ) of each layer should be satisfied.

$$\delta > d \tag{6}$$

Furthermore, the multi-layer magnetic thin-film should preferably satisfy equation (7) below which relates coercivity ($Hc_a$) of magnetic thin-film a nearest the substrate and coercivity ($Hc_b$) of magnetic thin-film b farthest from the substrate. Also, equation (8) below, relating saturation magnetization ($Ms_a$) of magnetic thin-film a nearest the substrate and saturation magnetization ($Ms_b$) of magnetic thin-film b farthest from the substrate, should also be satisfied as well.

$$Hc_b \geq Hc_a \tag{7}$$

$$Ms_b \geq Ms_a \tag{8}$$

It is also acceptable to have the structure control underlayer composed of two layers or more. For example, an amorphous layer of Si or Ge is formed on the substrate, and an hcp structure underlayer is formed thereover. By changing the conditions under which each of these two layers are formed (temperature, sputtering gas pressure, formation speed, composition, etc.), particle size in the underlayer can be controlled, and as a result, the crystal grain size of the magnetic thin-film formed on top of the entire underlayer can be controlled as well.

Through the procedures described hereinbelow, we have achieved the desired objects of our invention by a magnetic recording media, produced through sputtering, which uses a stacked underlayer formed through the interaction of multiple varieties of non-magnetic materials with non-magnetic substrates. This media is exemplified by an hcp magnetic alloy thin-film and tempered glass substrate, an Ni-P plated Al alloy substrate, a Si substrate with the surface thermally oxidized, or a ceramic substrate, and confirmed by our evaluation of the crystalline characteristics of the media, magnetic characteristics, anti-corrosiveness, and the reliability of adhesiveness with the substrate, as well as the recording read-back characteristics of various magnetic heads in a magnetic disk system that uses this media.

A magnetic recording system, which utilizes our inventive media, is comprised of the magnetic recording media, a magnetic head which reads back the recording on the media, a drive system which imparts relative motion between the media and the magnetic head, and an actuator which determines the position of the magnetic head over the media. The magnetic recording media is characterized by having multiple underlayers, alternately formed with hcp non-magnetic materials and body centered cubic (bcc) non-magnetic materials, between a non-magnetic substrate and a hcp magnetic alloy thin-film, the latter containing various magnetic layers. This magnetic recording system also utilizes a dual head containing an inductive head for writing and a magnetoresistive (MR) head for reading, i.e., having an MR head as a read-back element. For this system, the magnetic recording media should preferably be formed by a hcp magnetic alloy thin-film situated on the underlayer formed on a non-magnetic substrate. Here, the underlayer, situated between the non-magnetic substrate and hcp magnetic allow film, is preferably formed through multiple layers, each alternately formed of a hcp non-magnetic film, for which the c-axis is preferentially oriented in a perpendicular direction to the substrate surface and a bcc non-magnetic film, for which the <110> surface is preferentially oriented in a perpendicular direction to the substrate surface. To make the hcp alloy film into a longitudinal magnetic film, the bcc non-magnetic film needs to be the uppermost layer of the multiple alternately formed underlayer, hence having the bcc non-magnetic film lying immediately below and interfaced to the hcp magnetic allow film. In contrast, to form a perpendicular magnetic film, then the uppermost layer of these underlayers, specifically, that particular layer interfaced to the hcp magnetic alloy film, is preferably a hcp, rather than the bcc, non-magnetic film. Further, in our inventive recording system, MR head should preferably be a spin-valve type MR head with particularly high read-back efficiency.

The hcp non-magnetic material used in the underlayer of the inventive recording media contains at least one element from the group including Ti, Zr, Hf, and Ru. The bcc non-magnetic material for the inventive recording media contains at least one element from the group including Cr, Mo, W, V, Nb and Ta. The hcp magnetic alloy film for this media is a magnetic film composed of a Co-based alloy thin-film for which the Co composition ratio is at least 50%. This Co-based alloy thin-film exhibits increased effectiveness, in terms of recording read-back characteristics, if it is a Co—X2 element alloy film containing a total volume of at least 0.1% and less than 25% of at least one of the elements from group X including Cr, V, Mo, W, Ti, Mn, Re, Sm, Fe, and O. Co-based alloy films are even more effective in terms of anti-corrosiveness and recording read-back characteristics if a Co-X-Y element alloy film is used which contains a total volume of at least 0.1% and less than 15% of at least one of the elements from group Y including Zr, Ti, Hf, Ta, Ru, Rh, Pd, and Pt.

In order to implement ultra high-density magnetic recording of 1 Gb/in$^2$ or above, the spacing between the recording media surface and the magnetic head must be set on the order of tens of nanometers. Hence, the undulations in the magnetic film surface are kept as small as possible, preferably less than 10 nm. To do this, the thickness of the structure control layer of said magnetic film must be kept as thin as possible and generally within a range of greater than 5 nm and less than 100 nm. To achieve high reproducibility, this thickness should preferably be within a range of 10 to 50 nm.

The thin-film for the inventive magnetic recording media can be formed using conventional physical deposition methods, such as the vacuum evaporation, high frequency sputtering, and ion beam sputtering.

An hcp Co-based alloy has high crystal magnetic anisotropy in the c-axis direction, with longitudinal magnetic recording media orienting this c-axis within the substrate surface. The structure control thin-film is used to highly orient this c-axis within the substrate surface. The Cr alloy thin-film underlayer is used as a structure control thin-film for controlling the crystal grain size and crystal orientation of the Co-based magnetic thin-film epitaxially grown on this underlayer. By using an alloy thin-film with Cr as the main component for the structure control thin-film, the crystal grain size for this layer can be made smaller than that in Cr-only thin-films, which, in turn, permits the crystal grain size of the magnetic thin-film formed on this underlayer to be controllably reduced.

When epitaxially growing a stacked magnetic thin-film so as to interface magnetic thin-films of two or more different compositions, the magnetic thin-film crystal lattice constant for each film changes according to changes in the composition of that layer. For example, when Pt is added to a CoCr alloy, depending on the volume added, the lattice constant changes by 1 to 3%. In other words, by interfacing compositionally different (different lattice constant) thin-films through epitaxial growth, the coercivity of the magnetic thin-film will improve as a result of stress generated at an interface boundary between those films.

By making a multi-layer structure of the stacked magnetic film using a non-magnetic layer, the magnetic exchange interaction strength along the thickness of magnetic thin-film can be controlled and read-back noise can be reduced. To sufficiently weaken the magnetic exchange interaction between the magnetic thin-films, the thickness of non-magnetic layer should be 10 nm or less. If this layer is epitaxially grown to a thickness that exceeds 10 nm, then disadvantageously the coercivity of the magnetic layer decreased and read-back noise increases.

Preferably for the inventive media, the lattice constant difference $\Delta L_1$, between the underlayer and the magnetic thin-film nearest to the stacked magnetic film substrate and the lattice constant difference $\Delta L_2$, between the underlayer and the magnetic thin-film farthest from the substrate, should be related by $\Delta L_2 > \Delta L_1$. If this relationship is satisfied, then good epitaxial crystal growth can occur from the underlayer to the surface of the multi-layer stacked magnetic film and a magnetic recording media with low-noise, suitable for high-density magnetic recording, can be obtained.

The c-axis direction in a hcp Co-based alloy has high crystal magnetic anisotropy. This direction, for our inventive perpendicular magnetic recording media, is either perpendicular to the substrate surface of this c-axis or oriented in an inclined direction within a range of 0 to 45 degrees from a direction perpendicular to a direction of travel of the magnetic head. A perpendicular magnetic head (single pole magnetic head) can be used to form a perpendicular recording magnetic field. However, generally, a ring type magnetic head is used as employed in longitudinal recording. When a ring type magnetic head is used, a stray magnetic field from the head, which impinges on the magnetic recording media, is inclined in relation to the surface of the media. This inclination effectively permits this inclined stray magnetic field to be used for perpendicular recording, in which case the magnetically easy axis of the recording media thin-film should be inclined relative to a normal line of the surface of the substrate. Considering that perpendicular recording is performed, the angle of inclination should be 0 to 45 degrees in relation to the substrate surface normal line. Furthermore, the direction of inclination should beneficially be oriented along the direction through which the magnetic head travels. To highly orient c-axis of the Co-based alloy in this direction, a magnetic thin-film structure control underlayer is used. The underlayer is used as a structure control thin-film for controlling the crystal grain size and crystal orientation of the Co-based magnetic thin-film epitaxially grown over it.

Ti, Ta, Ru, Hf, and Co are the main components of the structure control thin-film underlayer. By using an alloy thin-film made by adding Cr, V, or W to these, crystal grain size in this underlayer can be reduced below that of hcp single thin-films. Consequently, the crystal grain size of the magnetic thin-film, grown on this structure control thin-film underlayer, can be reduced as well. For a magnetic thin-film suitable for high-density magnetic recording, the magnetically easy axis c-axis is oriented either perpendicular to the substrate surface or at an inclined direction in a range of 0 to 45 degrees in the travel direction of the magnetic head. Each of the magnetic particles in the magnetic thin-film should preferably be magnetically isolated. To accomplish this, each individual magnetic crystal should preferably be formed on each crystal grain which forms the structure control thin-film.

When used as a media for ultra high-density recording of 1 Gb/in$^2$ or more, the grain size of the magnetic particles in the magnetic thin-film is homogenous within a range of 5 to 50 nm, and the particles themselves isolated. To achieve this, the crystal grain size of the magnetic film structure control underlayer is also preferably homogeneously distributed in the range of 5 to 50 nm.

For ultra high-density magnetic recording of 1 Gb/in$^2$ or more, the recording bit length is reduced to 0.2 $\mu$m or less. Hence, to lessen the effect of demagnetizing fields during magnetic recording and to implement stable high-density recording, the thickness of each layer of the magnetic film should preferably be larger than the magnetic crystal grain size.

As noted above, by forming a magnetic film with multiple magnetic layers separated by a non-magnetic intermediate layer, the magnetic exchange interaction strength can be controlled along the direction of thickness of the magnetic film. Advantageously, through such control, generation of reverse magnetization (a magnetic domain formed in a reverse direction to the magnetic recording direction) can be suppressed during perpendicular recording, and read-back noise is reduced. With conventional longitudinal magnetic recording, the magnetic interaction between the formation of the zigzag border between magnetic domains of adjacent recording bit was a cause of read-back noise. With perpendicular recording, the formation of reverse magnetization in the recorded domain appears to be one factor in generating read-back noise, but since the present inventive magnetic recording media suppresses the generation of reverse magnetization, read-back noise is reduced.

If the inventive media is constructed to satisfy equations (1) and (2), then advantageously: (a) a decrease in coercivity and anisotropic magnetic fields caused by multi-layering can be presented; (b) read-back noise, due to reverse magnetization formed in the recording bits during magnetic recording, is reduced; and (c) a magnetic recording media suitable for high-density magnetic recording can be obtained.

Viewed differently, for the inventive multi-layer magnetic thin-film, perpendicular magnetic anisotropy in a direction parallel to the film surface originates with: Co-based magnetic thin-film crystal magnetic anisotropy, a shape of magnetic anisotropy itself resulting from magnetic particle shapes, and magnetic anisotropy attributed to stress generated at interfaces between stacked magnetic films with different lattice constants. In that regard, when magnetic recording is accomplished through a magnetic head situated in very close proximity to the film surface, the closer a tip of the head is located to the surface of the media, the stronger will the magnetic flux be that impinges on the surface and is generated by the head. Good perpendicular recording can be effectively implemented by increasing the magnetic anisotropy of the upper magnetic layer on the inventive media. Magnetic anisotropy, caused by stress generated at the interface between different layers in a stacked magnetic film, has a relationship, as noted above, of $a_2 > a_1$. When magnetic films of different a-axis lengths are stacked, the magnetic film with the greater axis length undergoes compression in the direction along which the a-axis contracts. As a result, this causes magnetic anisotropy to increase through tensile extension of the c-axis of the magnetic film. By satisfying the relationship $a_2 > a_1$ for the a-axis lengths of the stacked magnetic film, magnetic anisotropy of the magnetic film increases near the magnetic head, in other words, far from the substrate.

It is possible to change the magnetic thin-film crystal lattice constant by changing the composition of the thin-film. For example, when Pt is added to a CoCr alloy, the lattice constant changes from 1 to 3% depending on the volume added. Therefore, by successive layering magnetic films of different compositions (hence different lattice constants) by epitaxially growing one atop another, magnetic thin-film coercivity can be improved through stress generated at the boundary between each pair of adjacent layers.

For the inventive media, the value of $(a_2-a_1)/a_1$ should lie with a range of 0.01 to 0.05. Specifically, whenever this value is less than 0.01, stress cannot be applied to the interface between adjacent epitaxially grown layers; also whenever this value exceeds 0.05, desirable epitaxial growth cannot be achieved.

When the values of $a_2 = a_1$, the same functional effects that would otherwise occur with these values being unequal and within the range set forth above can be obtained by selecting the appropriate materials for the non-magnetic intermediate layer.

Through satisfying equations (4) and (5) noted above, the formation of reverse magnetization otherwise formed in the recording bit during magnetic recording can be prevented, and high-density recording with low read-back noise can be advantageously implemented.

In that regard, reverse magnetization formed in the recording bit is a main cause of read-back noise during perpendicular recording. For the M-H curve of the typically used CoCr perpendicular magnetic film, Mr/Ms<0.3. This causes a demagnetizing field to be generated in the magnetic film, and because of this, reverse magnetization is formed in the recording bit during magnetic recording. To effectively prevent the generation of reverse magnetization, magnetic anisotropy in the direction perpendicular to the film surface should be strengthened to increase the Mr/Ms value. Ideally, Mr/Ms should equal 1. However, in practice, as long as the magnetic film satisfies a relationship of Mr/Ms$\geq$0.8, the read-back noise can be reduced below that associated with conventional prior recording media because, for example, the magnetic field size is minute even when reverse magnetization is generated. As long as the relationship of Mr/Ms$\geq$0.8 is satisfied, then 35°$\leq\theta\leq$90° will also be satisfied.

By satisfying equation (6) noted above, proper magnetic anisotropy can be impacted along the direction of the film thickness.

When magnetic recording is performed with the magnetic head spaced apart, though in very close proximity to, the film surface, the closer the film surface is to the surface of the tip of the magnetic head then, the stronger is the magnetic flux that is generated by the head and which impinges on the film surface. However, if the head is positioned increasingly closer to the substrate surface than the film surface, then the magnetic flux that impinges the film surface will become increasingly weaker. To obtain good overwrite characteristics during saturation recording, coercivity of the magnetic film should increase as the head moves closer to the film surface. To increase the stray magnetic field from the surface of the recording media and to increase read-back output, the recording magnetism of the film surface should preferably increase. By satisfying equations (7) and (8) noted above, good overwrite characteristics and increased read-back output can be obtained.

Generally, it is known that in thin-films, produced through conventional formation processes such as sputtering or vacuum evaporation, a close-packed plane is preferentially oriented. Therefore, for hcp thin-films and bcc thin-films, it is easy to preferentially orient the c-plane (or c-axis, when it represents the orientation of the c-plane) and <110> plane, respectively. Further, if a difference in the lattice interval between the hcp thin-film c-plane and the bcc thin-film <110> plane is less than about 10%, then, when stacking the respective crystal planes, upper and lower layers are insignificant, and epitaxial growth is possible. When hcp thin-films with the c-plane as the preferentially orientation and bcc thin-films with the <110> plane as the preferential orientation are alternately stacked, crystal growth is suppressed due to a small amount of nonconformance along a common interface between the crystal lattices of these two thin-films, and very fine crystal grains are obtained. The epitaxial growth of Co-based alloy hcp magnetic alloy films, in which the c-plane is inclined within the film surface, on top of a Cr film which has <110> plane orientation is well known. The hcp magnetic alloy film crystal grains, formed on the uppermost layer of an alternately stacked underlayer, can be made smaller by placing a Cr layer for which the <110> plane is the preferential orientation on the uppermost layer. These same results are likely to occur if, instead of Cr, any of the elements including Mo, W, V, Nb, and Ta, which have the same bcc structure as Cr, is used.

We have produced a magnetic recording media by the methods discussed below and have confirmed the functions described above.

On a 2.5 inch magnetic substrate disk of an Al alloy plated with Ni-P and polished to a mirror finish, tempered glass, or thermal-oxidized Si single crystal, various hcp non-magnetic films of thickness 0.1 to 20 nm and various bcc non-magnetic films of thickness 0.1 to 20 nm were alternately layered 2 to 400 times to produce various underlayers by dc magnetron sputtering. These layers were produced under the following conditions: substrate temperature—room temperature to 400° C., back pressure—10 nTorr (1 $\mu$Pa) or less, Ar gas pressure—1 to 10 mTorr (0.1 to 1.3 Pa), and applied power density—0.5 to 10 W per/cm$^2$. When stacking was accomplished twenty times or more, the film was fabricated while rotating the substrate on an hcp non-magnetic target and the bcc non-magnetic target was being sputtered at 10 to 60 rpm.

We studied various cases in which the bottom layer or the uppermost layer were switched in hcp non-magnetic films and bcc non-magnetic films for the alternated stacked underlayer. We then formed various Co-based alloy magnetic films with film thicknesses from 10 to 40 nm and a 10 nm C protective layer thereover, and then evaluated magnetic characteristics, crystalline characteristics, and recording read-back characteristics. We evaluated recording read-back characteristics by two methods: self read/write, using a thin-film magnetic head, and read/write separation, the latter using a recording read-back separation head being a combination of a thin-film magnetic head and an MR head.

DETAILED DESCRIPTION OF THE PREFERRED EMBODIMENT

Preferred Embodiment 1

Hereafter, we will explain the preferred embodiment of this invention in detail by referring to figures. In the figures, items with the same numbers refer to parts with the same performance characteristics.

Figure 1A:
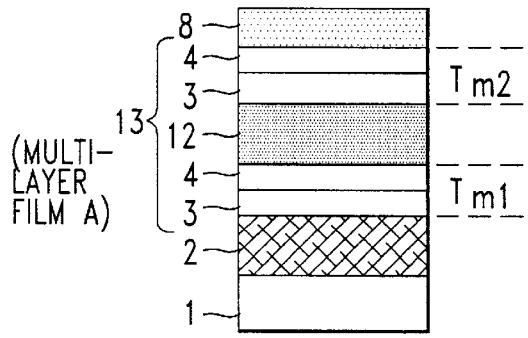
FIGS. 1(a) through 1(e) depicts a cross-section diagrams of preferred and comparative embodiments of a multi-layer thin-film structure magnetic recording media according to this invention.
Figure 1B:
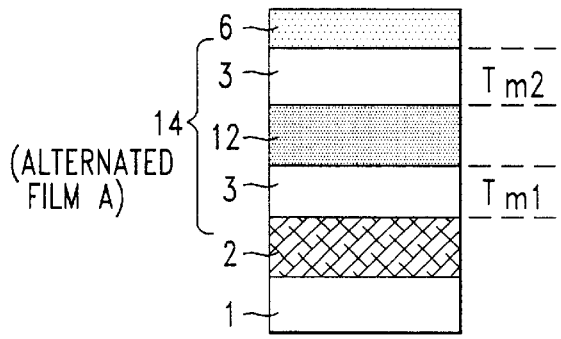
Figure 1C:
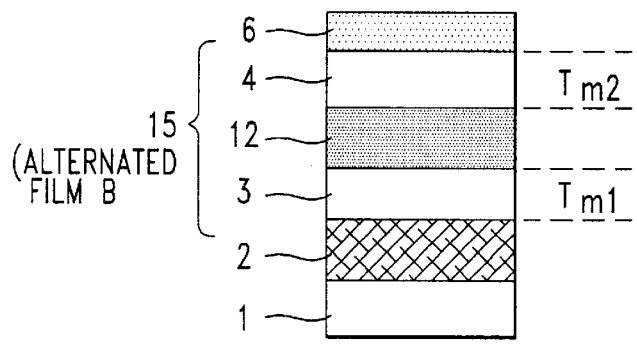
Figure 1D:
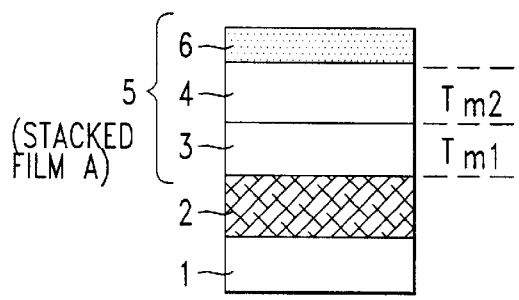
Figure 1E:
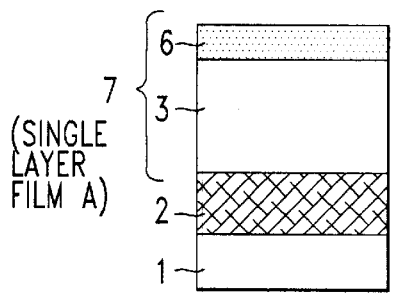

FIG. 1(a) shows a preferred embodiment of our invention which implements high-density magnetic recording media with low-noise characteristics. In addition, this embodiment controls the magnetic exchange interaction in the longitudinal and thickness directions of the magnetic film as well as attempts to increase coercivity and decrease film thickness.

To form this embodiment as shown, washed glass substrate 1 was placed in a sputtering device which was evacuated to a vacuum of $2\times10^{-7}$ Torr. Next, substrate 1 was heated to 200° C., and underlayer 2 of thickness 50 nm, which acts to control magnetic film structure, was formed thereon. Cr was used for underlayer 2. Alternatively, Cr could be used as a main component of underlayer 2 along with any of the elements including V, Ti, Ru, Hf, Ir, Mo, Pd, Pt, Re, Ta, Ti, or Zr added thereto. The above mentioned underlayer 2 has a body centered cubic (bcc) lattice structure, with the growth azimuth being <110> or <100>. Under the same vacuum, first magnetic film 3 and second magnetic film 4 were formed in that order on the underlayer thus forming a lower stacked film. Next, non-magnetic layer 12 was formed on top of the stacked film, with thereafter, another (here, upper) stacked film, again formed of first magnetic film 3 followed by second magnetic film 4, fabricated on top of layer 12. This yielded a multi-layer film 13 made from two stacked films, i.e., two sets of stacked magnetic films (replicated layers 3 and 4). Cr was used for non-magnetic layer 12.

Each thin-film was formed using DC magnetron sputtering with sputtering Ar gas set at a pressure of 15 mTorr. An alloy of the same composition as that of each thin-film to be produced was successively used for the magnetic film formation target. Protective layer 8, approximately 10 nm in thickness, was formed above multi-layer film 13. In this preferred embodiment, first magnetic film 3 was formed of a Co-based alloy with 16% Cr and 4% Ta, by atomic; the second magnetic film 4, also Co-based, contained 11% of Cr and 15%. of Pt. All compositional percentages referred to hereinafter, are molecules, i.e., atomic, percentages.

In this embodiment, the lattice constant of the Co-based alloy used for the second magnetic film 4 was approximately 2% larger than the lattice constant of Co-based alloy used for the first magnetic film 3. Consequently, the relationship $\Delta L_2 > \Delta L_1$ exists between lattice constant difference $\Delta L_1$ of underlayer 2 and the first magnetic film and lattice constant difference $\Delta L_2$ of underlayer 2 and the second magnetic film. If the difference between $\Delta L_2$ and $\Delta L_1$ is too large, then it becomes difficult to produce epitaxial growth; however, if this difference is too small, then only a small amount of lattice distortion ensues and only a rather small increase in coercivity occurs. We have found that 1 to 5% is appropriate for the lattice constant difference in relation to Co-based alloy which is used for the first magnetic film. The difference between $\Delta L_2$ and $\Delta L_1$ can be freely set by changing the composition of the elements added to the Co-based alloy.

While the film thicknesses $t_{m1}$ of the first magnetic film 3 and $t_{m2}$ of the second magnetic film can be freely selected, we have set them equal in this embodiment, i.e., $t_{m1}=t_{m2}$. Stacked film thicknesses $T_{m1}$ ($=t_{m1}+t_{m2}$) and $T_{m2}$, of the entire lower and upper stacked films, can also be freely selected. Here, too, we set them equal to 15 nm, i.e., $T_{m1}=T_{m2}=15$ nm, and will explain why.

For purpose of comparison, we fabricated several different versions of our inventive magnetic film, but all with the same overall thickness for the layered structure formed on underlayer 2. In particular, the version of the magnetic film shown in FIG. 1(*b*) contains dual layer alternated, rather than stacked, magnetic film 14 having two identical magnetic thin-films 3 separated by an intermediate non-magnetic layer 12. The thickness of the magnetic film ($T=T_{m1}+T_{m2}$) situated on the underlayer 2 was set equal to that for the embodiment shown in FIG. 1(*a*). With respect to the version shown in FIG. 1(*c*), there alternated magnetic film 15 was formed in the order of first magnetic film 3, then non-magnetic layer 12, and followed by second magnetic film 4. The version of our inventive magnetic film shown in FIG. 1(*d*) contains stacked film 5, formed in the order of first magnetic layer 3 formed on the underlayer 2 followed by second magnetic layer 4. Lastly, the version shown in FIG. 1(*e*) contains single-layer film 7 formed from only first magnetic film material 3 fabricated on the underlayer 2.

To easily reference each of the different basic structural topologies depicted in FIG. 1, we will refer to a topology, shown in FIG. 1(*a*), of replicated stacks of two magnetic layers (e.g., films 3 and 4) separated by a non-magnetic intermediate layer as "multi-layer film A"; a topology, shown in FIG. 1(*b*) of identical single magnetic layers (film 3) separated by a non-magnetic intermediate layer as "alternated film A"; a topology shown in FIG. 1(*c*) of different single magnetic multi-layers (films 3 and 4) separated by a non-magnetic layer as "alternated film B"; a topology shown in FIG. 1(*d*) of two different magnetic layers (films 3 and 4) without any intervening non-magnetic layer as "stacked film A"; and a topology shown in FIG. 1(*e*) of a single magnetic film by itself as a "single layer film A".

We confirmed through X-ray and electron microscope analyses that the multi-layer film A, alternated films A and B, and stacked film A are all films which were epitaxially grown on the underlayer.

Figure 2:
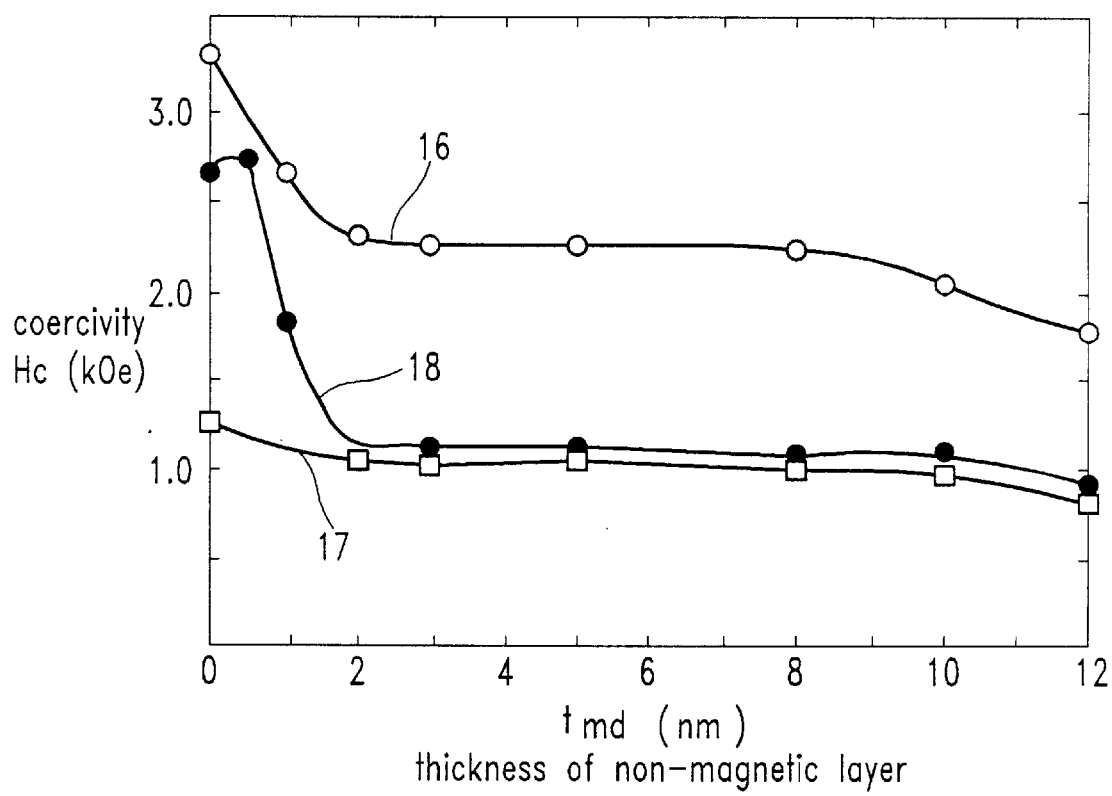
FIG. 2 depicts a diagram explaining an effect in the recording media of a non-magnetic layer used in the configurations shown in FIG. 1.

For the three types of magnetic films mentioned above which contain non-magnetic layers, FIG. 2 graphically shows coercivity of each of these layers as a function of the thickness, $t_{md}$, of the non-magnetic layer. In the figure, curve 16 shows the coercivity of multi-layer film A, curve 17 shows the coercivity of alternated film A, and curve 18 shows the coercivity of alternated film B. As is clearly evident from this figure, the magnetic film made from our inventive multi-layer film A provides coercivity of 2000 Oe or more which is suitable for ultra high-density magnetic recording. With the thickness, $t_{md}$, of the non-magnetic layer in a range of $0 \leq t_{md} < 10$ nm, coercivity of 2000 Oe or more is obtainable. Preferably to implement this layer using industrial mass production equipment currently in use, the thickness of non-magnetic layer, to provide sufficiently high coercivity, should at least be 1 nm. FIG. 2 clearly shows, from curve 16, that multi-layer film A satisfies this condition.

Figure 3:
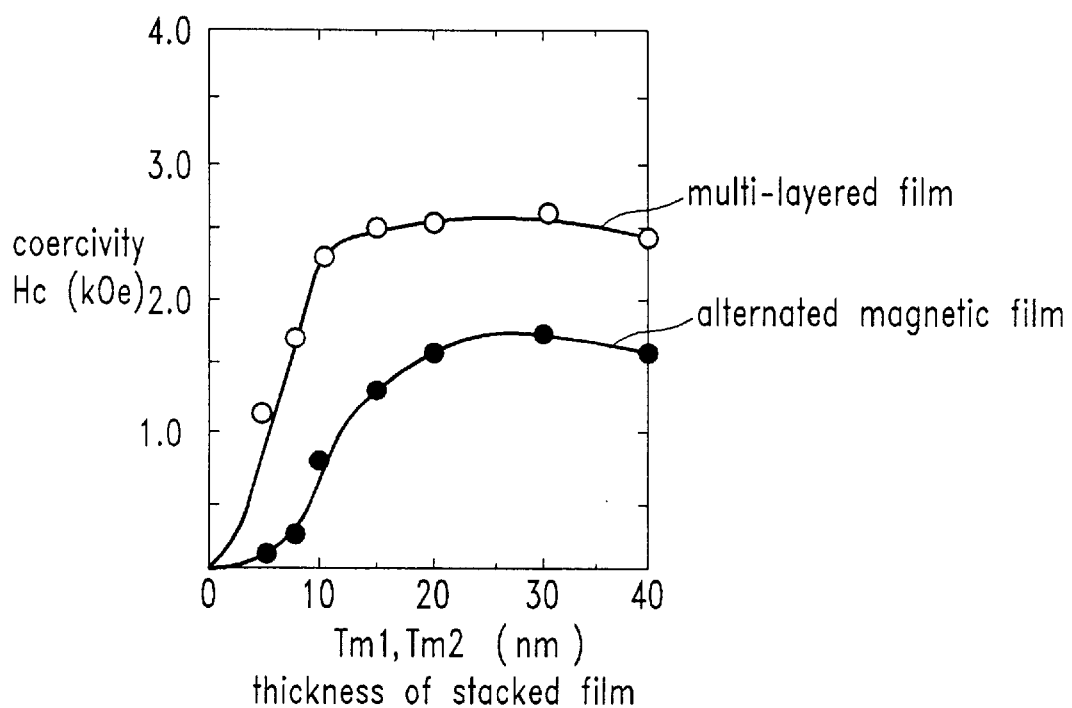
FIG. 3 depicts a diagram showing the coercivity of a multi-layer film through a preferred embodiment and an alternated film of a comparative embodiment of this invention.

With the thickness, $t_{md}$, of non-magnetic layer 12 is set at 2 nm for a magnetic film containing the multi-layer film A of FIG. 1(*a*), FIG. 3 shows the coercivity when the thickness ($T_{m1}$, $T_{m2}$) of the stacked films, each made from the first and second magnetic films, is changed. For purposes of comparison, the characteristics of a magnetic film having the alternated film B shown in FIG. 1(*c*) are also shown in FIG. 3. As can be clearly seen, high coercivity can be obtained for our inventive multi-layer recording media even if the stacked film thickness is thin, at approximately 10 nm. Although FIG. 3 shows a trend in the magnetic field strength characteristic with equal stack thicknesses, i.e., $T_{m1}=T_{m2}$, the same trend occurs with unequal stack thicknesses, i.e., $T_{m1} \neq T_{m2}$.

Figure 4:
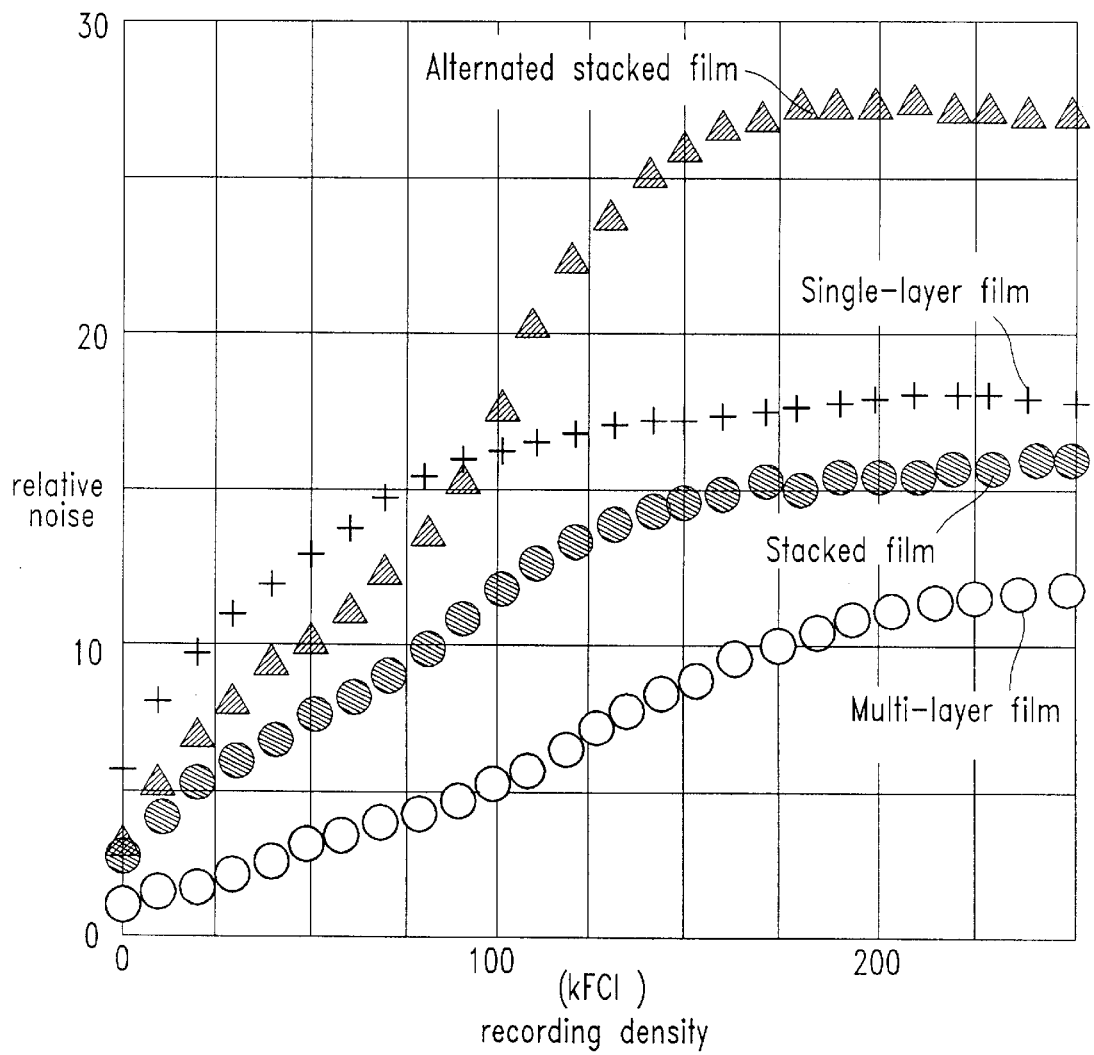
FIG. 4 depicts a diagram showing recording media noise characteristics.

Magnetic recording was performed on these various embodiments using a thin-film magnetic head. The read-back signal noise characteristics, specifically dependence of this noise on recording density, were measured using a magnetoresistive head. For comparison, the results are graphically shown in FIG. 4 for the various inventive structures described above. These recording read-back characteristics were measured while maintaining 80 nm magnetic spacing between the head and the media being measured. As clearly shown from the figure, the inventive multi-layer film yields magnetic recording with the least read-back noise, for all recording densities, as compared to the other embodiments of our inventive recording media. Even with current equipment, our invention can achieve recording density of 1 Gb/in$^2$.

Aside from the above explanation, the first and second magnetic films of the multi-layer film in our inventive magnetic recording media, can be formed from materials including Co as a main component and one or more of the elements including Cr, Mo, V, Ta, Pt, Si, B, Ir, W, Hf, Nb, Ru, Ti, Ni and rare earth elements. The relationship between lattice constant difference $\Delta L_1$ of underlayer 2 and the first magnetic film, and lattice constant difference $\Delta L_2$ of underlayer 2 and the second magnetic film needs to satisfy $\Delta L_2 > \Delta L_1$. As long as the difference between $\Delta L_2$ and $\Delta L_1$ is between 1 and 5% in relation to the first magnetic layer lattice constant, combinations of materials of different compositions are also acceptable. However, a skew direction (+/− direction), in relation to the underlayer lattice constant of the lattice constant of magnetic film 1 and that of magnetic film 2 must be the same. For the non-magnetic layer, besides Cr, materials containing at least one of Cr, V, Ti, and Ru, or an alloy material including these can be used, such as, for example, a Cr—V alloy, a Cr—Ti alloy, or a Co—Cr alloy (with 25% Cr or more). Non-magnetic layers of both bcc lattice structure and hcp lattice structure can yield the same results. Further, vacuum evaporation, sputtering or particularly ion beam sputtering can be used to form each thin-film layer.

Though we have shown and described certain of our inventive embodiments, in terms of a stacked film made from two types of magnetic layers the same results can be obtained by using more than two magnetic layers. In that regard, a magnetic recording media with low read-back noise characteristics like those mentioned above, can be implemented by stacking three or more magnetic layers, each stacked magnetic film to collectively form with intervening non-magnetic layer to form a multi-layer film.

Preferred Embodiment 2

For an embodiment shown in FIG. 5, underlayer 22 is formed as a structural control layer on washed glass substrate 21. Thereafter, a perpendicular magnetic recording media using a Co-based magnetic thin-film is formed on layer 22 using the procedure described hereafter.

Washed glass substrate 21 was placed in the sputtering device which was then evacuated to a vacuum of $2\times10^{-7}$ Torr. Next, substrate 21 was heated to 200° C., and an underlayer of thickness 30 nm was formed as a structural control layer. Typically, Ti, Ta, Ru, Hf, or Co materials, with an hcp structure, are used for underlayer 22; however, an hcp structural underlayer can be produced with Cr, V, or W added, or an Si or Ge amorphous underlayer. In this preferred embodiment, a Ti-Cr alloy with 10% Ti, by atomic, was used. Consequently, here underlayer 22 has an hcp structure with the length azimuth of <00·2>.

Figure 5A:
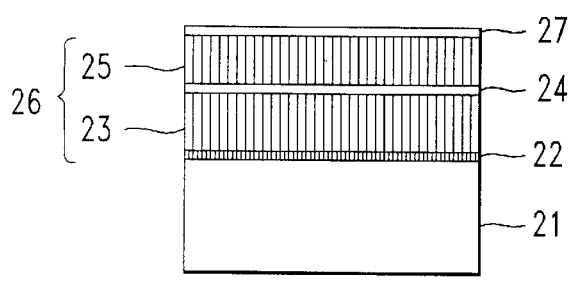
FIGS. 5(a) and 5(b) collectively depict diagrams of magnetic recording media in which diagram (a) shows a basic structural diagram of a multi-layer thin-film structure recording media according to this invention, and diagram (b) shows a structural diagram of a prior art single-layer thin-film structure recording media.

Under the same vacuum, the first magnetic film 23, here a single layer having a thickness of 50 nm, non-magnetic intermediate layer 24 and second magnetic film 25, a single layer having a thickness 50 nm, were successively formed in that order over underlayer 22, then yielding multi-layer film media 26 shown in FIG. 5(a). On this multi-layer film media, carbon protection layer 27, having a thickness 10 nm, is formed. Non-magnetic intermediate layer 24 is a film having a thickness ranging from 0 to 13 nm.

With this preferred embodiment, a Co-based alloy having 15% Cr, 6% Pt and 3% Si was used for first magnetic film 23; another Co-based alloy with 10 atomic % Cr and 15 atomic % Pt was used for second magnetic film 25. The same results can be obtained if either of these two films is formed with Co as a main component and materials including one or more of elements including Cr, Mo, V, Ta, Pt, Si, B, Ir, W, Hf, Nb, Ru, Ti, Ni, Co or rare earth elements or a compound of these is additionally used.

Ru was used as the non-magnetic intermediate layer 24. However, as long as the epitaxial growth conditions are not appreciably hindered, the same results can be obtained alternatively using materials of Ti, Hf, Ta, Co or these with at least one of Cr, V, Ti, Ru, W, Mo, Pt, Si, Ge, or B hcp structure materials or alloys thereof; face centered cubic (fcc) materials such as Pt or Pd, or bcc materials such as Cr, or amorphous materials such as Si, Ge, or B.

Thickness ($\delta_a$) of first magnetic film 23 and thickness ($\delta_b$) of the second magnetic film 25 can be freely selected.

In this preferred embodiment, the thin-films were formed using sputtering; however, these films can also be formed using vacuum evaporation method or particularly ion beam sputtering.

Although we have shown and described this particular preferred embodiment of the inventive magnetic media shown in FIG. 5(a), as having two magnetic thin-film layers separated by a non-magnetic layer, the same advantageous results can be obtained by stacking more than two magnetic thin-film layers with or without a non-magnetic intermediate layer situated between any two successive magnetic thin-film layers.

Comparative Embodiment

Figure 5B:
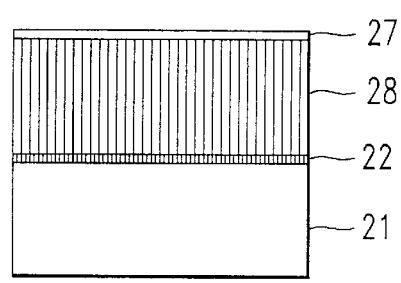

For comparison, we fabricated an embodiment of our inventive magnetic media ($\delta=\delta_a+\delta_b$) shown in FIG. 5(b). Here, single-layer magnetic film 28 is formed on the underlayer 22 with the structure such that the thickness ($\delta$) of single-layer film 28 equaled $\delta_a+\delta_b$. This magnetic thin-film had the same composition as first magnetic film 23 in preferred embodiment shown in FIG. 5(a); namely, i.e., Co with (by atomic) 15% Cr, 6% Pt and 3% Si.

Figure 6:
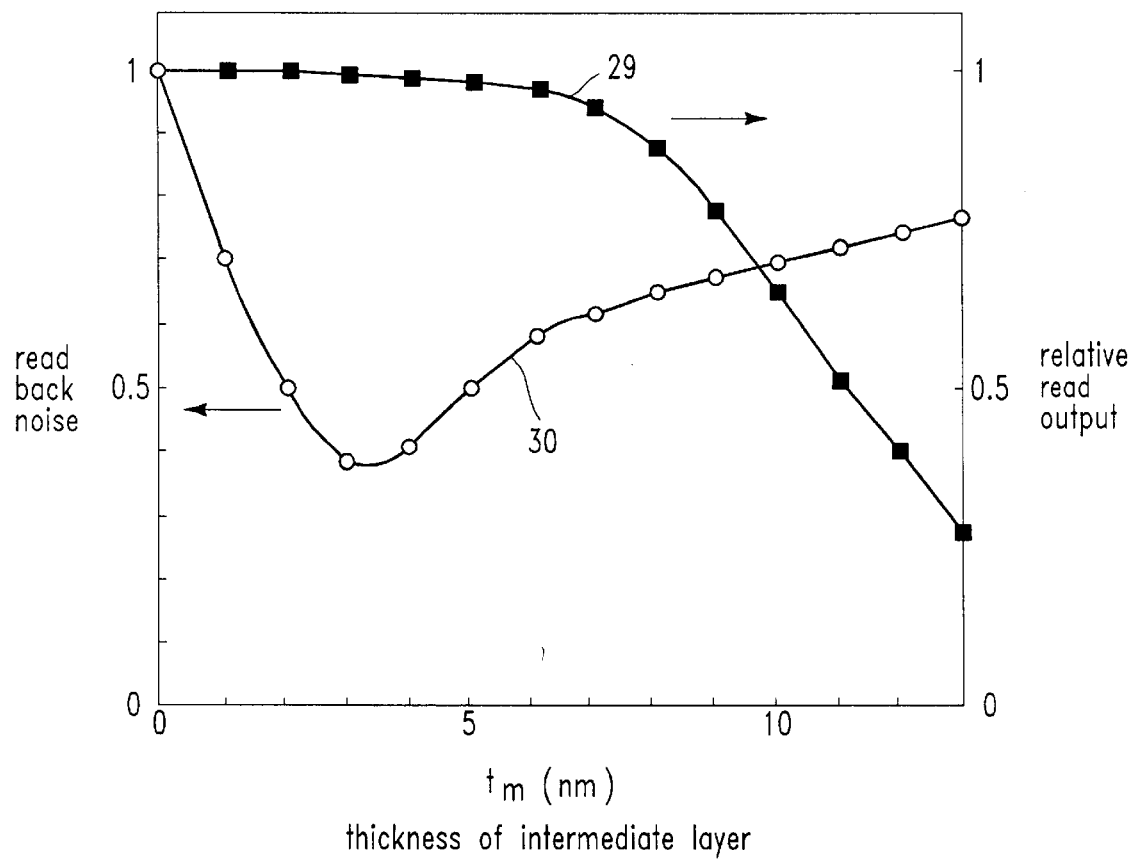
FIG. 6 depicts a diagram explaining the effects of intermediate layers.

Magnetic recording was performed, using a ring type magnetic recording head, on the multi-layer magnetic recording media of the preferred embodiment 2 described above and shown in FIG. 5(a). FIG. 6 shows the effects of the thickness of the non-magnetic intermediate layer on the relative read output, as characteristic curve 29, and, as characteristic curve 30, on read-back noise. To facilitate comparison and easy illustration, both of these characteristic curves are shown in normalized form.

As clearly shown in FIG. 6, multi-layer media 26, formed by stacking two types of magnetic film via a non-magnetic intermediate layer, exhibits decreased read-back noise 30 for any non-magnetic intermediate layer thickness compared to a single-layer magnetic film formed only from one type of magnetic film, i.e., the latter occurs at $t_m=0$. Particularly, when the thickness, trn, of the non-magnetic intermediate layer is in the range of $0<t_m\leq8$ nm, the read-back noise is significantly reduced with an advantageous effect occurring of being able to limit any reduction in read-back signal output to 10% or less.

We observed the fine structure of the multi-layer film of this embodiment with an electron microscope. From our observations of electron beam diffraction images and lattice images, we confirmed that the magnetic film 26 and intermediate layer were both epitaxially grown, and that a relationship of $a_2>a_1$ existed between the a-axis length ($a_1$) of the first magnetic film 23 and a-axis length ($a_2$) of the second magnetic film 25. As compared to $a_1$, $a_2$ appeared to have about a 2% larger value. We also confirmed that the magnetically easy c-axis was oriented perpendicular to the film surface. The result of compositional analysis of a cross-section of the thin-film showed that the boundaries of the magnetic layers and the intermediate layer were clearly separated, and that non-magnetic Cr in the periphery of the fine Co grains were segregated in the magnetic thin-film. The segregation of this non-magnetic Cr weakened the magnetic exchange interaction strength between adjacent magnetic particles. Furthermore, the segregation of the first magnetic layer and second magnetic layer, by the non-magnetic intermediate layer, weakened the magnetic exchange interaction strength in the direction of the film thickness. Consequently, an increase in read-back noise caused by the formation of reverse magnetization, otherwise occurring magnetic recording, could be suppressed.

For the multi-layer media and single-layer media structures shown in FIG. 5, magnetic recording was performed after current erasure. FIG. 7 shows magnetic status for each of these two media, after recording, based on observations we made, through a magnetic force microscope, of the magnetic status. In the diagram, the lengths and magnetic orientation of resulting magnetic domains (cylindrically indicated) are represented by lengths and directions of corresponding arrows with relative magnetic strength of each such domain represented by color (solid white or black being high strength).

As shown in FIG. 7, for a single-layer media formed by one type of magnetic film, magnetic domain boundaries 31, having anti-parallel magnetic directions 32 and 32' to each other, are produced. In this case, magnetic domain boundaries 31 are magnetized anti-parallel to each other, and to eliminate the influence of the demagnetizing field in this region, relatively strong recording magnetization 33 (domain magnetization in the same direction as an applied recording magnetic field) is formed. However, the effect of the demagnetization field becomes stronger as distance away from the recording magnetic field boundary 31 increases. Consequently, magnetization occurs in the opposite direction to that the internal magnetization direction 32 and 32' of a recorded bit; in other words, areas of reverse magnetization 34, are formed. The size of this reverse magnetization 34 depends on the strength of the interaction between adjacent magnetic particles. Adding a non-magnetic element, such as Cr, to a Co-based alloy and forming a segregated structure is effective in suppressing reverse magnetization.

The generation of reverse magnetization 34 is a cause of read-back signal noise. Recording magnetization 33 and reverse magnetization 34 depend on the stacked orientation of the saturation magnetization (Ms) or residual magnetization (Mr) in the thin-film layers, and magnetic film thickness ($\delta$). Therefore, to reduce reverse magnetization 34, it is effective to reduce the magnetic film thickness ($\delta$) within a range in which read-back output is not reduced.

Figure 7A:
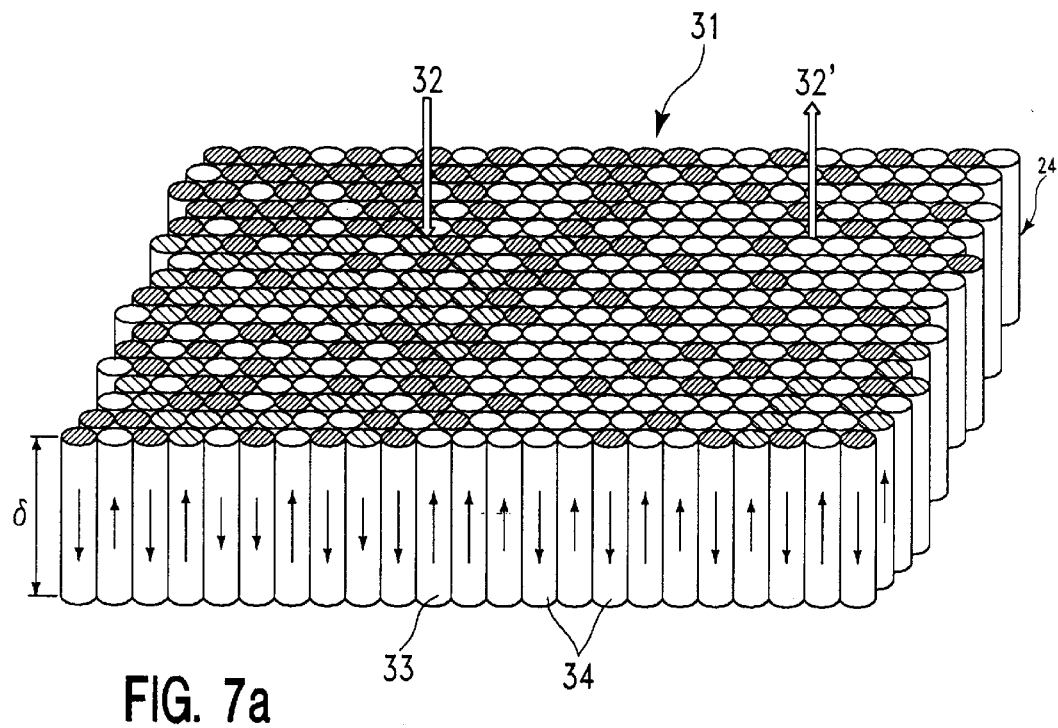
FIGS. 7(a) and 7(b) collectively depict diagrams which collectively illustrate recording magnetization status in which diagram (a) illustrates recording magnetization status of a prior art single-layer thin-film structure recording media, and diagram (b) illustrates recording magnetization status of our inventive multi-layer thin-film structure recording media.
Figure 7B:
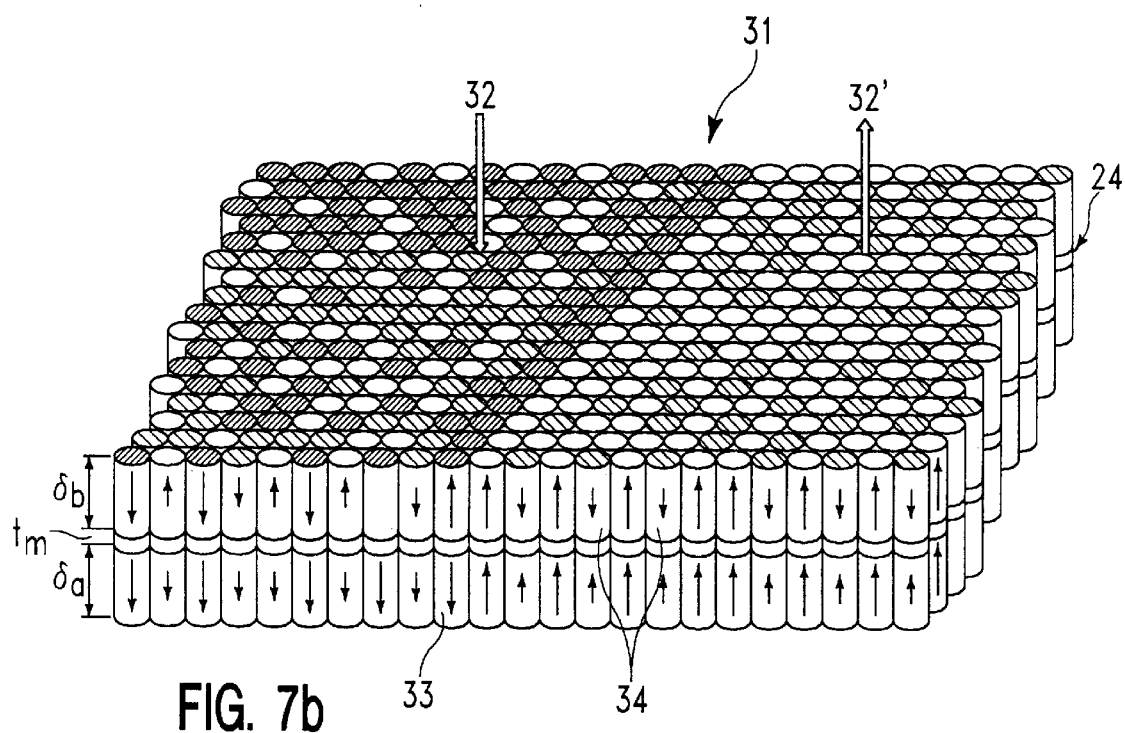

FIG. 7(b) shows the magnetic status of our inventive multi-layer media, in an illustrative recorded state identical to that shown in FIG. 7(a), with a structure in which two types of magnetic (single-layered) thin-film are separated by non-magnetic intermediate layer 24. In this case, magnetization boundary 31 has a clearer, more defined structure than that of the single-layer media shown in FIG. 7(a). Even in the case shown in FIG. 7(b), magnetization still locally occurs in a reverse direction to the recording magnetization directions 32 and 32'; in other words, areas of reverse magnetization 34, are formed. Inasmuch as the magnetic film thickness ($\delta_a$ or $\delta_b$) contributes to the formation of reverse magnetization 34, the film thickness ($t_m$) of the non-magnetic intermediate layer, situated between the two types of magnetic film, can be suitably chosen to reduce the reverse magnetization. Inasmuch as doing so will weaken the strength of reverse magnetization 34 formed in the recording bit, the read-back signal noise will be reduced.

If the relationship ($\delta_a$ or $\delta_b$)>d is satisfied between magnetic crystal grain size (d) and multi-layer magnetic film thickness ($\delta$) for the multi-layer magnetic media shown in FIG. 7(b), then magnetic anisotropy in a direction perpendicular to the film surface exists in the media. With this embodiment, if the average magnetic crystal grain size is 30 nm, this relationship is satisfied.

When recording magnetization 33 is formed with a magnetic cluster made from multiple magnetic crystal grains, settings are made so that the following relationship is satisfied: ($\delta_a$ or $\delta_b$)>a size of the magnetic cluster.

For this multi-layer magnetic media shown in FIG. 7(b), if the relationship $Ku_b \geq Ku_a$ exists between the magnetic anisotropy constant ($Ku_a$) for the first magnetic film 23 and the magnetic anisotropy constant ($Ku_b$) of the second magnetic film 25, then the generation of reverse magnetization during magnetic recording is effectively suppressed; hence, rendering the media suitable for high-density perpendicular magnetic recording. In this particular embodiment, $Ku_a$= $1.5 \times 10^6$ erg/cc, $Ku_b$=$3 \times 10^6$ erg/cc.

Figure 8A:
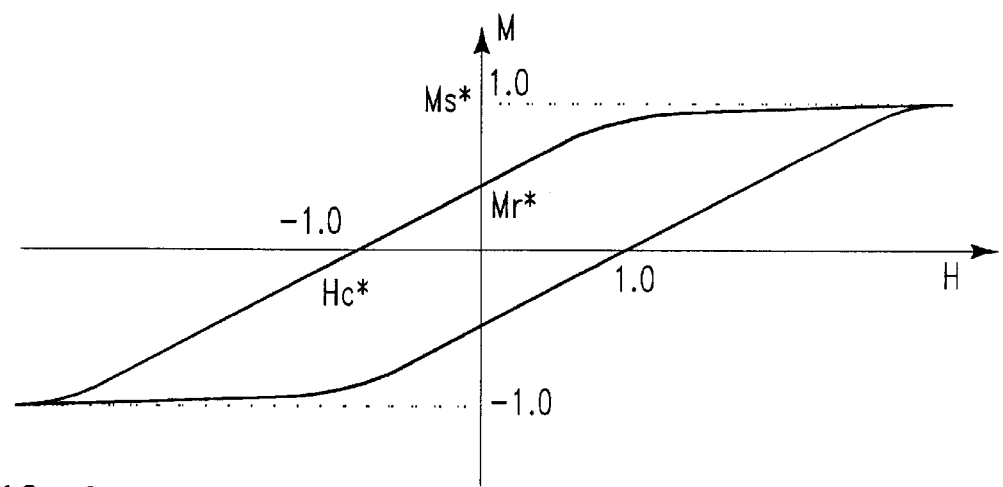
FIGS. 8(a) and 8(b) collectively depict diagrams graphically illustrate magnetization and magnetic field characteristics in which diagram (a) explains magnetization and magnetic field characteristics of a prior art single-layer thin-film structure recording media and (b) illustrates an example of magnetization and magnetic field characteristics of a multi-layer thin-film structure recording media according to this invention.
Figure 8B:
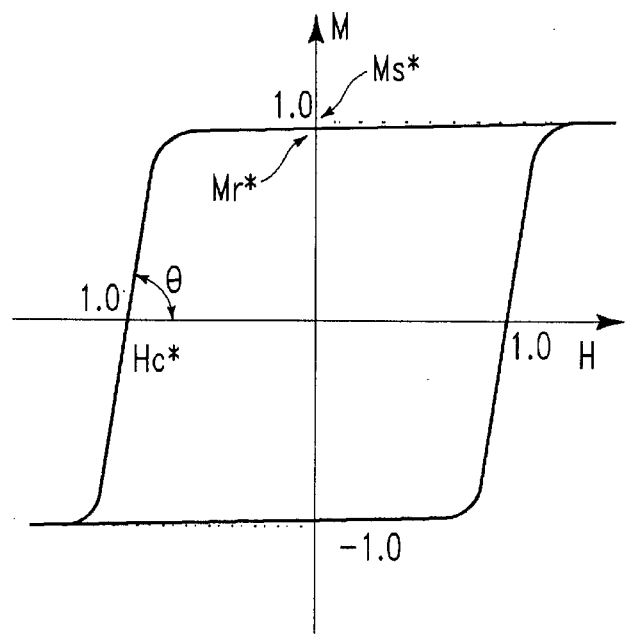

FIGS. 8(a) and 8(b) illustrate the magnetization and magnetic field characteristics (M-H characteristics) of the multi-layer perpendicular magnetic recording media of this embodiment (shown in FIG. 5(a)) and the single-layer perpendicular magnetic recording media of the comparative embodiment (shown in FIG. 5(b)).

Specifically, FIGS. 8(a) and 8(b) show normalized M-H characteristics with the measurement of these characteristics of the magnetically easy axis direction. For this embodiment, these characteristics were measured, using a vibrating sample magnetometer (VSM), in a direction perpendicular to the film surface. Resulting normalization M-H characteristics were generated by normalizing the measured magnetization of the media by its saturation magnetization (Ms) and by normalizing the magnetic field strength by coercivity ($H_c$). Consequently, the indicated value for saturation magnetization is shown by normalized saturation magnetization ($M_s^*$), the magnetization value for zero field strength is represented by normalized residual magnetization ($M_r^*$), and the magnetic field occurring at, the intersections of the M-H characteristic with the magnetic field axis, is shown by normalized coercivity ($H_c^*$).

For the single-layer perpendicular magnetic recording media of the comparative embodiment shown in FIG. 5(b), the normalized residual magnetization ($M_r^*$) value, shown in FIG. 8(a), is clearly smaller than the normalized saturation magnetization ($M_s^*$). Even if the crystal grain magnetically easy axis is highly oriented in the direction perpendicular to the film surface, the M-H characteristic becomes squarely shaped rather than skewed, as shown, but $M_r^*/M_s^*$ remains about 0.17 to 0.3. To increase the recording magnetization when magnetic recording is done using highly oriented perpendicular magnetic film, i.e., the residual magnetization, the saturation magnetization must be increased. However, with this particular media, reverse magnetization, in the opposite direction of the recording magnetization, results when the magnetic recording occurs, in turn, causing read-back signal noise.

On the other hand, with the inventive multi-layer perpendicular magnetic recording media as shown in FIG. 5(a), the $M_r^*/M_s^*$ ratio can be set large at $0.8 \leq M_r^*/M_s^* \leq 1$; hence, the magnetic anisotropy (Ku) can be established many times larger than that for single-layer perpendicular magnetic media. When the vertical and horizontal axis of the M-H curve are comparably scaled, the magnetic field ($M_r^*$) that occurs when the normalized M-H characteristics, for this particular media, intersect with the magnetic field axis, and the angle, ($\theta$), where the curve for normalized coercivity ($H_c^*$) intersects with the magnetic field axis, can both be increased, the latter by 35° to 90°. In other words, because $M_r^*$ and Ku are high, the inventive multi-layer perpendicular magnetic recording media can obtain high recording magnetization even with a relatively thin magnetic films, and still provide high read-back output. Through the ability to increase Ku, the area over which reverse magnetization is generated, during magnetic recording, can be reduced, and as a result, read-back noise can also be reduced. Inasmuch as recording magnetization boundaries can be clearly and sharply formed as shown, e.g., in FIG. 7(b), high-density magnetic recording is clearly possible.

Preferred Embodiment 3

For the multi-layer magnetic film shown in FIG. 5(a), the thickness of first magnetic film 23 and second magnetic film 25 both set at $\delta_a=\delta_b=50$ nm, and the compositions of the layer are: for first magnetic film 23 Co with 17% Cr and 4% Ta, and for the second magnetic film Co with 10 atomic % Cr and 15 atomic % Pt, and Pt as the non-magnetic intermediate layer 24.

In the case of the multi-layer film of this preferred embodiment, $(a_2-a_1)/a_1=0.025$, $Ku_a=0.9\times10^6$ erg/cc, $Ku_b=3\times10^6$ erg/cc, $Mr^*/Ms^*=0.9$, $\theta=85°$, and the ratio of the saturation magnetization of the first magnetic film 23 to the second saturation magnetization of the second magnetic film 25 is $Ms_a/Ms_b=0.65$.

The variations in both measured read-back noise and read-back output with changes in film thickness $t_m$ of the non-magnetic intermediate layer showed the same trends as depicted in FIG. 6.

In this particular preferred embodiment, $\delta_a$ and $\delta_b$ were set to the same value, but the same results will be obtained even if $\delta_a:\delta_b$ is varied within the range of 1:3 to 3:1.

Preferred Embodiment 4

Figure 9:
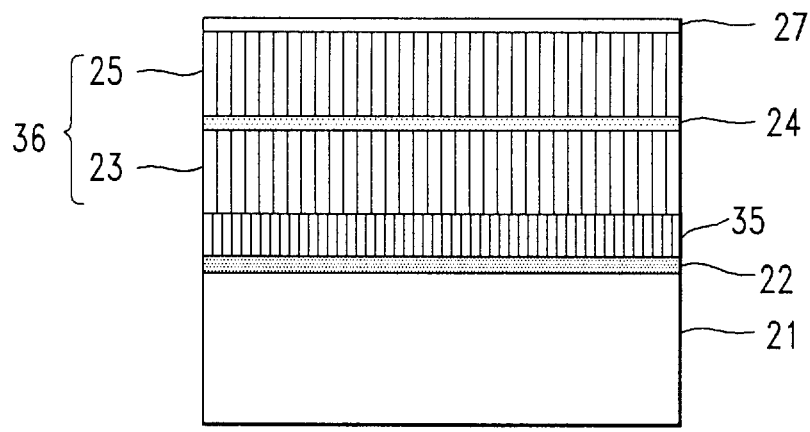
FIG. 9 depicts a cross-sectional diagram of yet another preferred embodiment of a multi-layer recording media according to the present invention.

Other preferred embodiments of this invention are explained with reference to FIG. 9.

As shown in this figure, amorphous underlayer 22 was first formed under vacuum conditions, on substrate 21. Si, Ge, B or an alloy of these can be used as the amorphous underlayer. Under the same vacuum, grain size control layer 35 was formed on underlayer 22. Hcp structured materials are preferable for use as the grain size control layer 35. In this case, free nucleation was done on the amorphous underlayer. A promotional effect of crystal growth occurred when the most close packed surface <00·1> of the underlayer was formed on the substrate. For example, when a Ti—Cr alloy is used as the grain size control layer, the grain size of layer 35 can be controlled by the composition of the alloy, formation temperature, formation speed and sputtering gas pressure. Next, first magnetic film 23, intermediate layer 24, and second magnetic film 25 are stacked in that order to form multi-layer media 36 situated on top of the layer 35.

For example, if the first and second magnetic films 23 and 25, respectively, were formed with Co, with x atomic % Cr and 4 atomic % Ta, the value of the two layer magnetic film saturation magnetization can be changed by varying the Cr concentration (x) in the thin-film. By setting the Cr concentration of the magnetic layer nearest the substrate surface to a relatively high value, the relative sizes of the sequential saturation magnetizations in the film thickness direction can be changed.

In this preferred embodiment, the first magnetic film 23 is formed as a 30 nm thick layer of a Co-based alloy having 17% Cr and 4% Ta; the second magnetic film 25 is formed of a 50 nm layer of a Co-based alloy having 10 atomic % Cr and 4 atomic % Ta. A 5 nm thick Ti-V alloy was used as the non-magnetic intermediate layer 24. The multi-layer magnetic film formed in this way was epitaxially grown on the crystal grains of the grain size control layer 35, with magnetic film grain size uniformly controlled through grain size control layer 35.

In the case of the multi-layer film of this particular preferred embodiment, $(a_2-a_1)/a_1=0.01$, $Ku_a=0.9\times10^6$ erg/cc, $Ku_b=1.2\times10^6$ erg/cc, $M_r^*/M_s^*=0.91$, $\theta=88°$, and the ratio of saturation magnetization of the first magnetic film $(Ms_a)$ to the saturation magnetization $(Ms_b)$ of the second magnetic film is $Ms_a/Ms_b=0.6$.

Here, too, the variations in both measured read-back noise and read-back output with changes in film thickness $t_m$ of the non-magnetic intermediate layer showed the same trends as depicted in FIG. 6.

Preferred Embodiment 5

Figure 10:
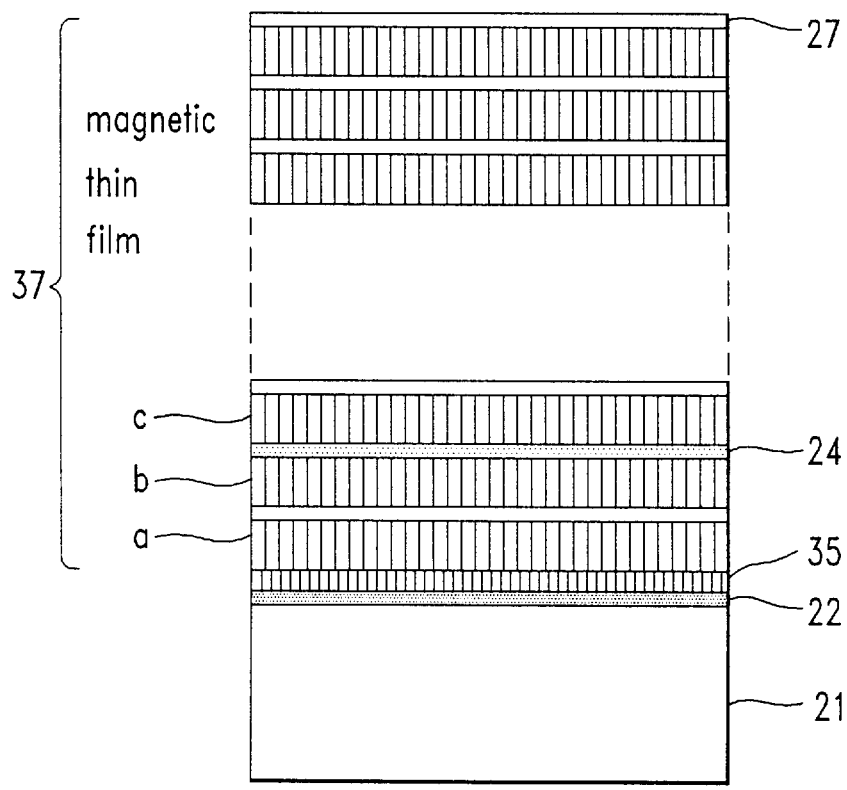
FIG. 10 depicts a cross-sectional diagram of yet another preferred embodiment of a multi-layer recording media according to the present invention.

FIG. 10 explains another embodiment of our inventive multi-layer magnetic recording media.

As shown in FIG. 10, underlayer 22 and grain size control layer 35 are successively formed in that order on the substrate 21. Thereafter, multi-layer media 37 is formed by repeatedly stacking multiple layers of magnetic films a, b and c with non-magnetic intermediate layer 24 situated between each successive pair of magnetic films, i.e., between films a and b, b and c. For simplicity, only one such intermediate layer is specifically numbered 24 in this figure. Magnetic films a, b and c have the same composition with Co or CoCr as a main component and Mo, V, Ta, Pt, Si, B, Ir, W, Hf, Nb, Ru, Ti or Ni added thereto. Pd was used for non-magnetic intermediate layer 24; however, other fcc materials such as Pt can also be used. A suitable thickness $t_m$ for non-magnetic intermediate layer 24 is between 1 to 7 nm. The film thickness of magnetic films a, b and c is each approximately 8 nm. The thickness of these three magnetic films can be sequentially changed in the direction of film thickness.

When multiple magnetic films are of the same composition are used, as here, magnetic anisotropy can be produced by generating stress at each epitaxial film interface of the magnetic film and non-magnetic intermediate layer by appropriately selecting materials for the non-magnetic intermediate layer.

In the case of the multi-layer film of this preferred embodiment, Co is used for magnetic films a, b and c, $a_1=a_2=a_3=0.2507$ nm, $Ku_a=Ku_b=Ku_c=4.4\times10^6$ erg/cc, $M_r^*/M_s^*=0.97$, $\theta=88°$ and $Ms_a=Ms_b=Ms_c$.

Again, the variations in both measured read-back noise and read-back output with changes in film thickness $t_m$ of non-magnetic intermediate layer 24 showed the same trends as shown in FIG. 6.

Preferred Embodiment 6

Figure 11:
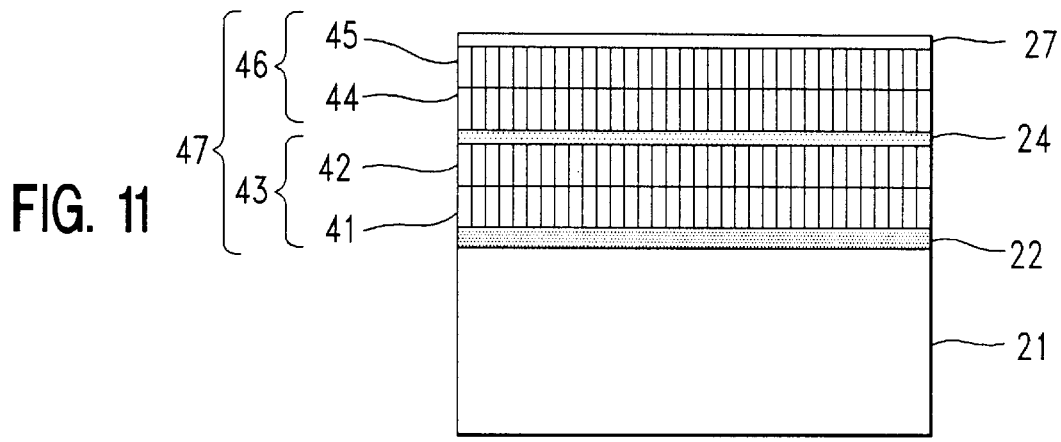
FIG. 11 depicts a cross-sectional diagram of yet another preferred embodiment of a multi-layer recording media according to the present invention.

Another preferred embodiment of this invention is explained in FIG. 11.

In this particular embodiment, as shown, structure control underlayer 22 is formed on substrate 21. Next, a first stacked film 43 is formed over underlayer 22 by directly layering, i.e., interfacing the boundaries of magnetic film 41 and magnetic film 42; these two films having different compositions. Magnetic film 41 and magnetic film 42 are both formed with Co as a main component with at least one or more elements or a compound from the group including Cr, Mo, V, Ta, Pt, Si, B, Ir, W, Hf, Nb, Ru, Ti, Ni, CoO and rare earth elements. For example, magnetic film 41 is fabricated as a Co-based alloy containing hcp structured materials 15% Cr, 6% Pt and 3% Si; magnetic film 42 is fabricated from another Co-based alloy containing 10 atomic % Cr and 15 atomic % Pt. The a-axis length in the crystals in these films is set so that the a-axis length in the film, i.e., film 42, located farthest from the substrate is larger than the a-axis length of the closer film, i.e., film 41. Second stacked film 46 is formed above stacked film 43 by directly layering, i.e., interfacing the boundaries, of magnetic film 44 and magnetic film 45, of different compositions, on non-magnetic intermediate layer 24 which itself is formed over stacked film 43. Carbon protection layer 27 is then placed above stacked film 43 to form multi-layer media 47. For magnetic film 44 and magnetic film 45, the same structure as that of magnetic film 41 and magnetic film 42 can be used; however, other structures may also be used. Here, too, a-axis length of the crystals in these films is set so that the a-axis length in the film farthest from the substrate, i.e., film 45, is larger than the a-axis length of the closer located film, i.e., film 44. With an average value of the a-axis of first stacked film 43 as $a_1^*$, and an average value of the a-axis length of second stacked film 46 as $a_2^*$, the relationship between these averages is set as $a_2^* > a_1^*$.

By making a multi-layer stacked film by directly interfacing the boundaries of compositionally different magnetic films as in this preferred embodiment, we can relatively easily form a media with high coercivity. Furthermore, coercivity can be readily controlled in the direction of film thickness. Of course, alternatively, magnetic films 41 and 42 can be fabricated of the same, rather than different, materials.

Preferred Embodiment 7

Figure 12:
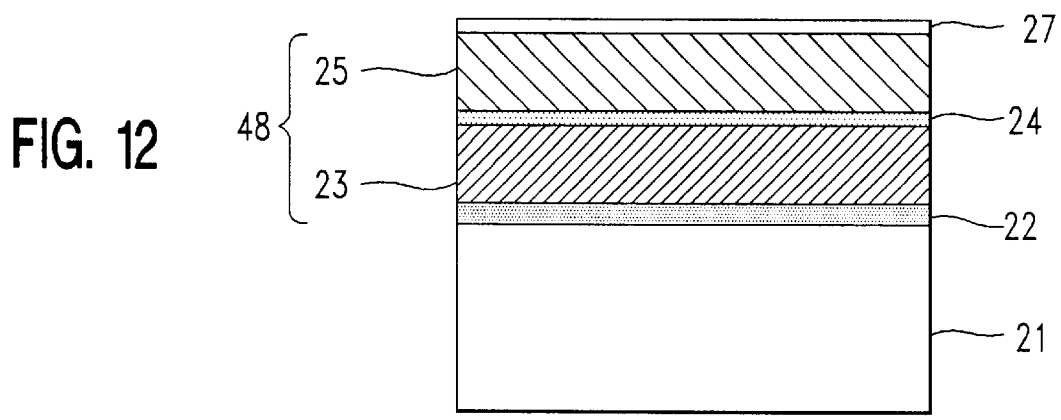
FIG. 12 depicts a cross-sectional diagram of yet another preferred embodiment of a multi-layer recording media according to the present invention.

Another preferred embodiment of this invention is shown in FIG. 12.

Here, underlayer 22 is formed on substrate 21. Magnetic material is then deposited on this underlayer in a direction inclined, e.g., 0° to 45°, to a line normal to a top surface of the substrate. This material forms first magnetic film 23. To complete multi-layer media 48, intermediate layer 24 and second magnetic film 25 are formed, in sequence, over film 23. A Co—CoO mixed film or Co-based alloy with Co as the main component can be used for each magnetic film. In this case, the magnetically easy axis of multi-layer media 48 approximately matches an incidence direction of the magnetic particles when the magnetic films are formed.

For this preferred embodiment, as fabricated, underlayer 22 is preferably formed of 50 nm layer of oxidized cobalt. Thus, the following layers are successively stacked atop each other: 50 nm layer of Co—CoO mixed film as the first magnetic layer 23 situated above underlayer 22, a 4 nm layer of CoO as the intermediate layer 24, and 50 nm Co-based alloy with 20 atomic % Cr as the second magnetic layer 25, followed lastly by a 5 nm of CoO as the protective layer 27. During fabrication, the deposition direction was 60° to the substrate surface.

When recording read-back is done on this particular media using a ring type magnetic head, recording magnetization forms in the same direction as stray magnetic fields of the magnetic head. Consequently, low-noise and high read-back output occurs, thus permitting high-density magnetic recording.

In the case of the multi-layer film of this preferred embodiment, the direction of the magnetically easy axis inclined approximately 60° to the substrate surface. Also, $Ku_a = 0.9 \times 10^6$ erg/cc and $Ku_b = 1.3 \times 10^6$ erg/cc.

Variations in both measured read-back noise and read-back output with respect to changes in film thickness $t_m$ of non-magnetic intermediate layer 24 displayed the same trends depicted in FIG. 6.

Preferred Embodiment 8

Figure 13:
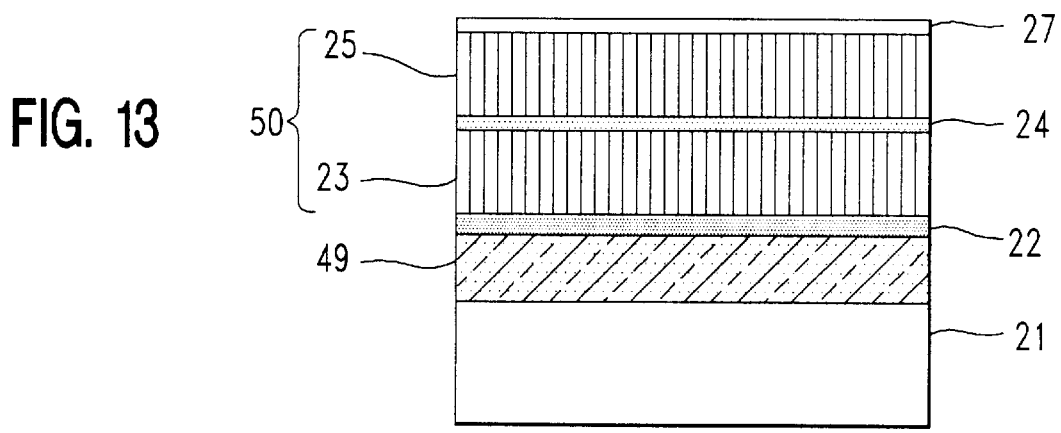
FIG. 13 depicts a cross-sectional diagram of yet another preferred embodiment of a multi-layer recording media according to the present invention.

Another preferred embodiment of the invention is shown in FIG. 13.

Here, as shown, a relatively soft magnetic material, i.e., one with high permeability, such as on the order of 50 to 1000, and coercivity less than 1000 Oe, is formed as a layered film 49 on substrate 21. A multi-layer magnetic film 50 having the same magnetic characteristics as, for example, that graphically shown in diagram (b) in FIG. 8, pictorially shown in FIG. 5(a) and discussed above, is thus formed over layer 49. Soft magnetic layer film 49 can be fabricated from amorphous soft magnetic materials such as permalloy or sendust, or amorphous soft magnetic materials composed of Co, Zr, Mo, Nb, W or Fe. A recording media with this particular structure can perform ideal perpendicular magnetic recording with a single pole magnetic head. Since this media will produce high-read-back output and low-noise, high-density magnetic recording is possible.

Preferred Embodiment 9

By changing the order of the media, including the underlayer, and situating a hexagonal system or cubic system underlayer as the highest, rather than lowest, layer of the magnetic film, the resulting material can be used as either a perpendicular magnetic recording media or a longitudinal magnetic recording media. To simplify the following discussion, we will explain this particular embodiment in terms of an illustrative longitudinal magnetic recording media.

Figure 14:
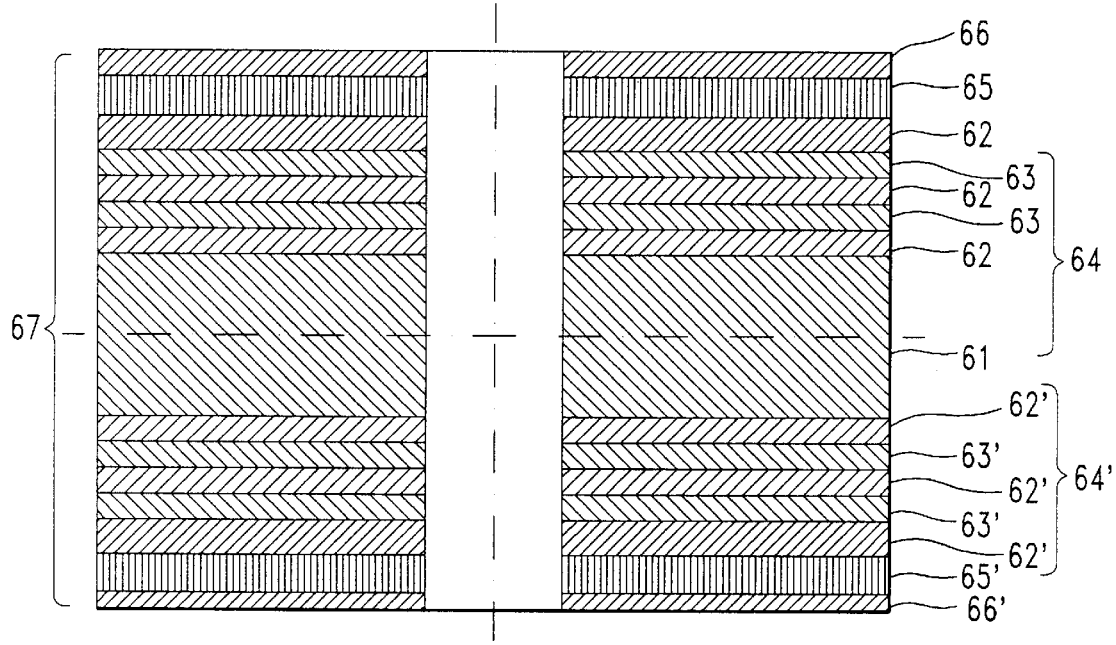
FIG. 14 depicts a cross-sectional diagram of a preferred embodiment of longitudinal magnetic recording media according to the present invention.

FIG. 14 shows a cross-section of our inventive longitudinal magnetic recording media. Non-magnetic substrate 61 is made by forming a 200 nm thick thermally oxidized film with a single Si crystal with a surface azimuth of <100>. This film possesses standard specifications of a 2.5 inch magnetic hard disk substrate wherein both surfaces are polished to a mirror finish and with each such surface having an average roughness factor (Ra) of 0.3 nm and a maximum roughness factor Rmax of 3 nm.

Through use of a dc magnetron sputtering device, various films are deposited, in the same sequence, on both surfaces of substrate 62. Specifically, Cr films 62 and 62', then Ti films 63 and 63', then again Cr films 62 and 62', and again Ti films 63 and 63' are successively formed on both surfaces of the substrate 61, in that order and with a thickness of 10 nm each. Thereafter, further 20 nm layers of Cr films 62 and 62' were formed to make alternated stacked underlayers 64 and 64'. Next, a Co-based alloy with 17% Cr and 5% Ta was formed, over both of these underlayers as magnetic alloy films 65 and 65', each formed to a thickness of 20 nm. Thereafter, 10 nm thick carbon protective lubricant films 66 and 66' were formed on top of films 65 and 65', respectively. The resulting multi-layer structure is magnetic recording media 67. During the formation of alternated stacked underlayers 64 and 64' and magnetic alloy films 65 and 65', the substrate temperature was 260° C., argon gas pressure was 2 mTorr (0.27 Pa), and applied power density was 2.8 w/cm². During formation of protective lubricant films 66 and 66', substrate temperature was 150° C., argon gas pressure was 10 mTorr (1.3 Pa), and applied power density was 3.2 w/cm². Corresponding to the ultra high vacuum used in the dc magnetron sputtering device, back pressure was held to 5 to 6 nTorr (7 to 8 μPa).

Figure 16A:
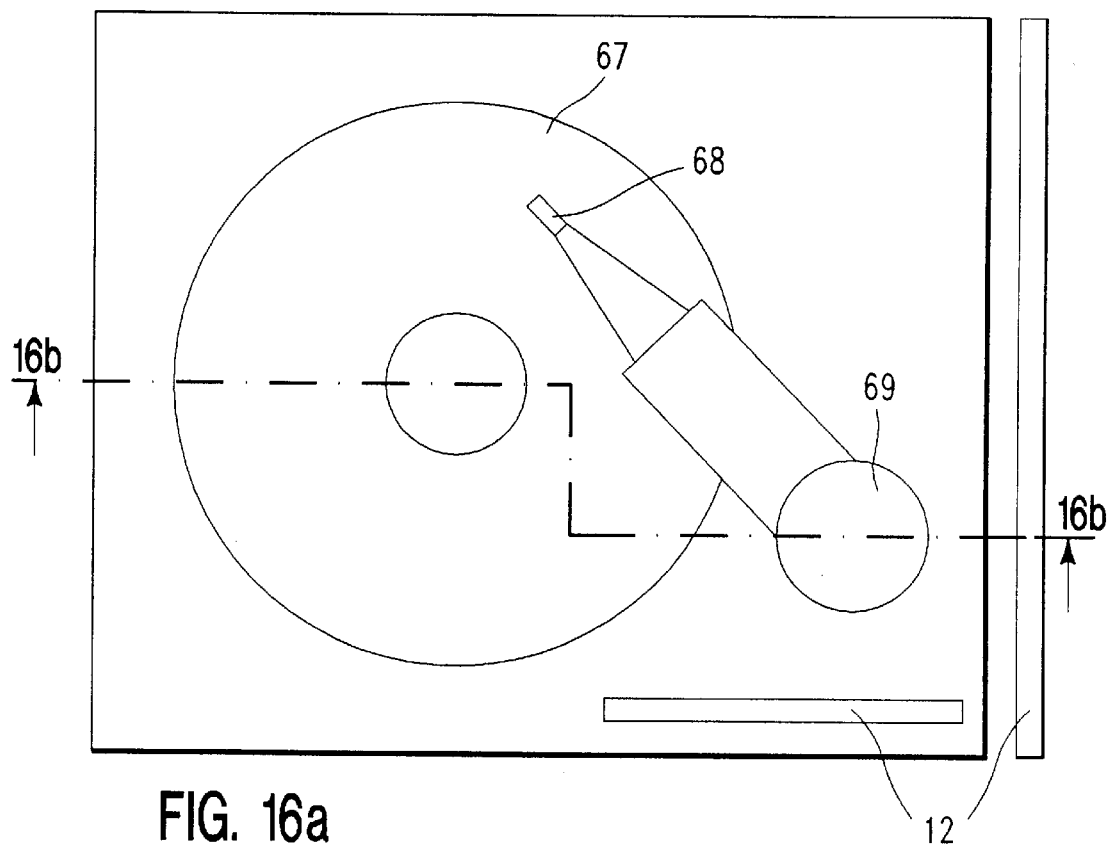
FIGS. 16(a) and 16(b) collectively depict, in top (a) and cross-sectional (b) views, the latter taken along lines A—A' in the former, a diagram of a preferred embodiment of a magnetic recording device according to the present invention.
Figure 16B:
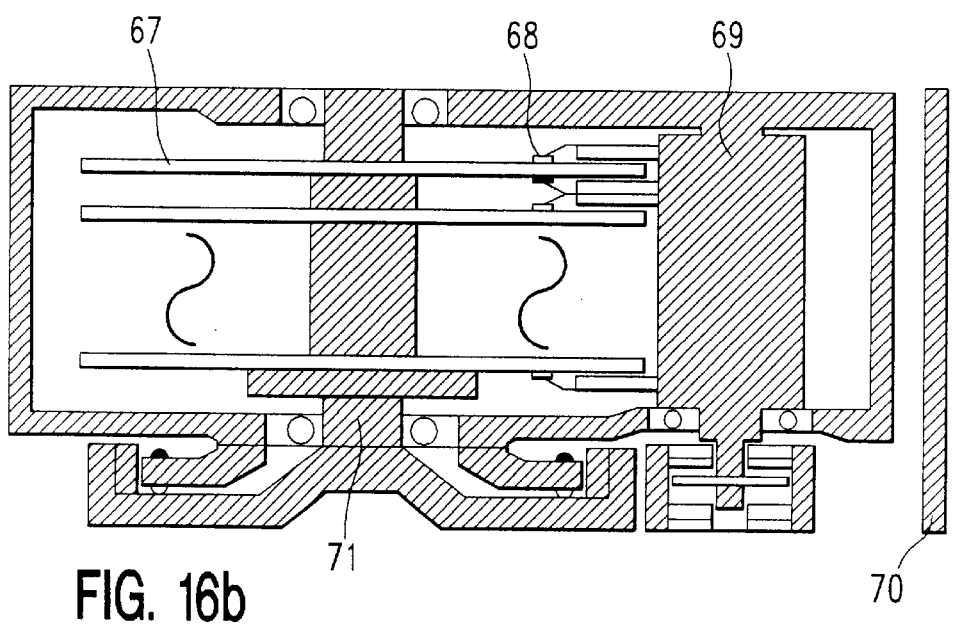

Magnetic recording media 67 was then incorporated into a hard disk drive as shown in FIGS. 16(a) and 16(b) to achieve low-noise, high-density recording. In particular, magnetic head 68 used within this drive is a dual head with an inductive head for writing and a magnetoresistive head for reading. Head 68 consisted of: a thin-film magnetic head with a recording gap length of 0.4 μm, track width of 1.0 μm, and a winding count of 30 turns; and a spin valve MR head with a read-back shield spacing of 0.3 μm and track width of 0.8 μm. Magnetic head drive system 69 employed a two level actuator with a piezo component and voice coil motor to properly position the magnetic head 68 over the media. The magnetic space between the magnetic head 68 and magnetic recording media during recording read-back was set at 0.05 to 0.06 μm.

Preferred Embodiment 10

Figure 15:
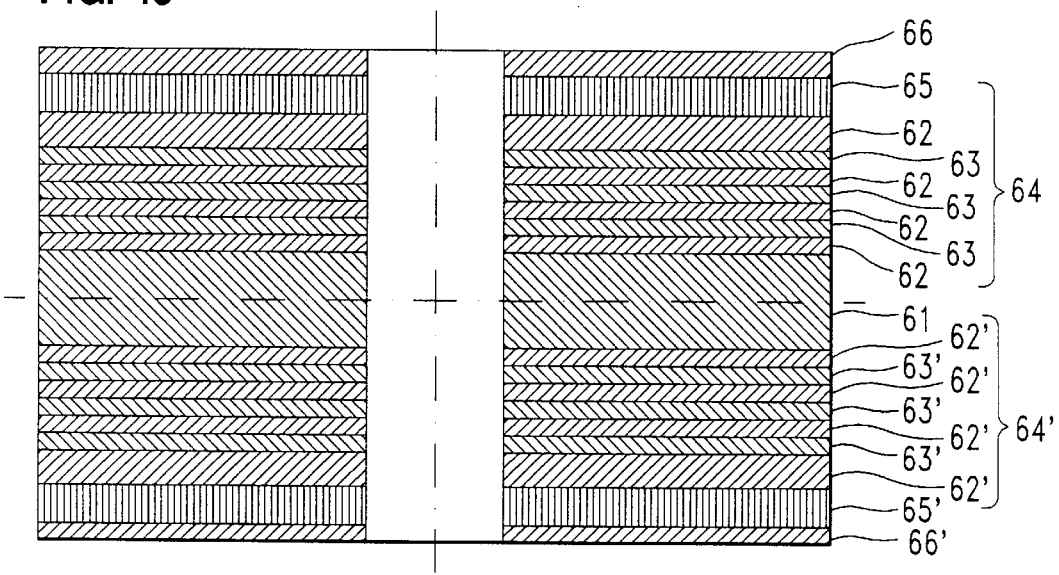
FIG. 15 depicts a cross-sectional diagram of another preferred embodiment of a longitudinal magnetic recording media according to the present invention.

We will explain preferred embodiment 10 while referring to the cross-section of the longitudinal magnetic recording media shown in FIG. 15. This embodiment is similar to media 67 shown in FIG. 14, but with differences made in alternated stacked underlayers 64 and 64'. In particular, to form the media shown in FIG. 15, 5 nm thick layers of Cr films 62 and 62' and Ti films 63 and 63' were alternately stacked in that order on corresponding sides of substrate 61 to form a total of six layers. Thereafter, 20 nm thick Cr films 62 and 62' were formed thereover to completely form alternated stacked underlayers 64 and 64'.

Preferred Embodiment 11

To form a new preferred embodiment, we again modified the alternated stacked underlayers of magnetic recording media 67 used in preferred embodiment 9 shown in FIG. 14. Here, from both sides of substrate 61, 10 nm thick layers of Ti films 63 and 63', Cr films 62 and 62' and Ti films 63 and 63' were alternately stacked in that order, and then 20 nm thick layers of Cr films 62 and 62' were formed to make alternated stacked underlayer 64 and 64'.

Preferred Embodiment 12

Now, for a new preferred embodiment, instead of using the Ti films for films 63 and 63' of magnetic recording media 67 of preferred embodiment 10, Zr films were used for films 63 and 63' and were formed under the same conditions as were Ti films 63 and 63', all other aspects of embodiment 10 being followed herein.

Preferred Embodiment 13

Furthermore, as another new preferred embodiment, instead of using Ti for films 63 and 63' as used in magnetic recording media 67 of preferred embodiment 10, Hf films were used instead for films 63 and 63', with all other aspects of these films and the media being the same as in preferred embodiment 10.

Preferred Embodiment 14

As an additional preferred embodiment, instead of using Ti for films 63 and 63' of magnetic recording media 67 of preferred embodiment 10, Ru was used for these films, with all other aspects of preferred embodiment 10 being followed herein.

Comparative Embodiment 15

Instead of the alternated stacked underlayers 64 and 64' of magnetic recording media 67 of preferred embodiment 9 shown in FIG. 14, we implemented an embodiment of our inventive magnetic recording media with Cr underlayer formed on each side of the substrate under the same sputtering conditions as used for preferred embodiment 9.

Comparative Embodiment 16

Furthermore, instead of using alternated stacked underlayers 64 and 64' of magnetic recording media 67 of preferred embodiment 9 shown in FIG. 14, we implemented an additional embodiment of our inventive media with a Cr-based alloy with 10% Ti as an underlayer formed on each side of the substrate under the same sputtering conditions as used for preferred embodiment 9.

We then separately incorporated each of the resulting recording media for preferred embodiments 9–14 and comparative embodiments 15 and 16, as media 67, into a magnetic hard disk drive as shown in FIGS. 16(a) and 16(b), as described above, to implement low-noise, high-density recording.

Table 1 shows the magnetic characteristics and recording read-back characteristics of preferred embodiments 9–14 and comparative embodiments 15 and 16. To measure and evaluate the magnetic characteristics of each of the preferred embodiments 9–14 and comparative embodiments 15 and 16, we fabricated a separate disk, 25 mm in radius, for each of these embodiments and then laid out about one control point in each 25 mm disk sample disks, 7 mm in diameter. We then cut out each of these 7 mm sample disks for each of the preferred embodiments 9–14 and comparative embodiments 15 and 16, and measured its magnetic characteristics. We utilized a vibrating sample magnometer (VSM) to measure one surface of each 7 mm sample disk with protective lubricant film 66', hexagonal system magnetic alloy film 65' and alternated stacked underlayer 64' removed therefrom. Table 1 shows saturation magnetization $M_s$, longitudinal coercivity $Hc\|$ and longitudinal squareness ratio $Mr\|/Ms$, which are magnetic characteristics we determined from magnetic curves we obtained with the VSM.

When four sites on a concentric circle were measured for each of the samples, there was almost no variance among the measured magnetic characteristics, and there was almost no anisotropy within the film surface of the same sample. Recording read-back characteristics were measured through the magnetic disk device noted in preferred embodiment 9. Table 1 also provides, as recording read-back characteristics, measured independent read-back output $E_{LF}$, output half recording density $D_{50}$, and media (signal/noise) S/N. For this Table, read-back output and media noise are measured directly after the read-back head, in other words, before any signal processing is done. To simplify comparison, the actual values of $E_{LF}$ and media S/N are not listed, but rather are shown in relative terms with respect to actual values of $E_{LF}$ and media S/N (both referenced to 1.0 in this table), respectively, of comparative embodiment 15.

TABLE 1

| Embodiment | $M_s$ (emu/cc) | $Hc_\perp$ (Oe) | $Mr\|/Ms$ | $E_{LF}$ | $D_{50}$ (kFCI) | Media S/N |
|---|---|---|---|---|---|---|
| Preferred embodiment 9 | 438 | 1880 | 0.91 | 1.12 | 148 | 1.41 |
| Preferred embodiment 10 | 441 | 1898 | 0.93 | 1.15 | 153 | 1.48 |
| Preferred embodiment 11 | 443 | 1873 | 0.89 | 1.16 | 142 | 1.40 |
| Preferred embodiment 12 | 439 | 1884 | 0.88 | 1.12 | 147 | 1.37 |
| Preferred embodiment 13 | 437 | 1853 | 0.89 | 1.11 | 143 | 1.38 |
| Preferred embodiment 14 | 440 | 1863 | 0.90 | 1.15 | 145 | 1.39 |
| Comparative embodiment 15 | 432 | 1431 | 0.83 | 1.00 | 128 | 1.00 |
| Comparative embodiment 16 | 439 | 1817 | 0.90 | 1.12 | 139 | 1.21 |

According to Table 1, the $Hc\|$ magnetic characteristics of preferred embodiment 9 and preferred embodiment 12 are higher than those of comparative embodiment 15. When $Hc\|$ is high, generally, the demagnetization field of the recorded magnetization decreases, thereby effectively increasing recording density. In contrast, the improvement of magnetic characteristics for comparative embodiment 16 is small; however, according to Table 1, the $D_{50}$ and media S/N recording read-back characteristics of preferred embodiment 9 and preferred embodiment 12 are improved compared to those of comparative example 2. For preferred embodiment 9 and preferred embodiment 12, the same effect occurs even if any one of a number of various Co-based alloys, e.g.: Co with 22% Cr; Co with 18% Cr and 8% Pt; Co with 16% Cr and 2% W; Co with 20% Cr and 5% Ti, or Co with 21% Sm are used in lieu of the Co-based alloy containing 17% Cr and 5% Ta for magnetic films 65 and 65'. Furthermore, the same effect was also obtained if Mo, W, V, Nb or Ta are used for Cr films 62 and 62'. The non-magnetic substrate 61 used for the magnetic recording media of preferred embodiment 9 and preferred embodiment 12 has a surface of amorphous material and has the same surface smoothness as a thermally oxidized single Si crystal substrate. We have also found that a glass substrate, carbon substrate, or an Si single crystal substrate with a natural oxidation film, can be used in lieu of the thermally oxidized single Si crystal substrate, provided the alternative substrate exhibits sufficient heat resistance to at least 300° C.

Through use of our inventive teachings, by using a multi-layer recording media, as discussed above, formed by stacking multiple magnetic layers, via a non-magnetic layer having a thickness in a range of $0 \leq t_{MD} < 10$ nm, to form a thin-film or forming the thin-film by directly layering at least two layers of magnetic films of different compositions on top of a magnetic thin-film structure control underlayer formed on a substrate, coercivity of 2000 Oe or more can be realized for the entire thin-film having a total thickness, $T_m$, in a range of $5 \leq T_m \leq 30$ nm. Consequently, use of our invention yields a magnetic recording media suitable for ultra high-density magnetic recording with low recording read-back noise characteristics, and thus one that is extremely useful in industry.

Further, through use of our inventive teachings, a multi-layer recording media can be formed by stacking in multiple layers, via a non-magnetic intermediate layer, magnetic films, made from two or more layers with different compositions, directly above a magnetic thin-film structure control underlayer formed on the substrate. This magnetic recording media is also suitable for ultra high-density magnetic recording with small recording read-back noise characteristics.

Through our invention, a longitudinal magnetic recording media, for recording at a very high surface recording density of over 2 Gb/in$^2$, can be obtained. Also, by combining this media with suitable technology which accurately positions a high read-back efficiency MR head or a high-density magnetic head, a magnetic disk device with very high surface recording density of over 2 Gb/in$^2$ can be advantageously produced.

What is claimed is:

1. A magnetic recording media comprising:
   a non-magnetic substrate;
   a magnetic film having at least two magnetic layers separated by a non-magnetic intermediate layer, each of the at least two magnetic layers having a lattice constant, the lattice constants being different from one another; and
   a structure control underlayer situated between the non-magnetic substrate and the magnetic film,
   wherein at least one of the at least two magnetic layers includes at least two magnetic films, of different lattice constants, which have been epitaxially grown so as to interface each other.

2. The magnetic recording media recited in claim 1 wherein the magnetic layers have different compositions.

3. The magnetic recording media recited in claim 2 wherein the magnetic film and non-magnetic layers are each epitaxially grown.

4. The magnetic recording media recited in claim 2 wherein a lattice constant of the magnetic film has skew in a same direction as skew in a lattice constant of the structure control underlayer, and a relationship $\Delta L_2 > \Delta L_1$ exists between a lattice constant difference $\Delta L_1$ between the underlayer and one of the magnetic layers located closest to the substrate and a lattice constant difference $\Delta L_2$ between the underlayer and one of the magnetic layers located farthest from the substrate.

5. The magnetic recording media recited in claim 2 wherein the non-magnetic layer is formed from a material having either at least one element from a group of elements, consisting of Cr, V, Ti, Ru, W and Mo, or an alloy containing any of said elements.

6. The magnetic recording media recited in claim 2 wherein the non-magnetic layer has a thickness of 10 nm or less.

7. The magnetic recording media recited in claim 2 wherein the magnetic film is fabricated from Co, as a main component, and from a material which includes at least one element from a group consisting of Cr, Mo, V, Ta, Pt, Si, B, Ir, W, Hf, Nb, Ru, Ti, Ni and rare earth elements.

8. The magnetic recording media recited in claim 2 having one set of stacked magnetic layers, wherein the one set of stacked magnetic layers has a thickness greater than or equal to 5 nm and less than or equal to 30 nm.

9. The magnetic recording media recited in claim 1 wherein the magnetic film satisfies a relationship of Mr/Ms$\geq 0.8$ between saturation magnetization (Ms) and residual magnetization (Mr), to which a demagnetizing field correction is not added, of the magnetic film in a magnetization-magnetic field curve in a magnetically easy axis direction and has an angle ($\theta$) formed by a tangential line, of a magnetic field curve wherein the curve depicts magnetic field strength normalized by coercivity, which passes through a zero magnetization point and a normalized magnetic field axis for the curve in the range of $35° \leq \theta \leq 90°$.

10. The magnetic recording media recited in claim 9 wherein the multi-layer magnetic film and non-magnetic intermediate layer are epitaxially grown.

11. The magnetic recording media recited in claim 9 further comprising an additional magnetic layer, having a magnetic permeability in a range of 50 to 1000, or a coercivity of less than 1000 Oe, situated between the structure control underlayer and the substrate.

12. The magnetic recording media recited in claim 9 wherein the magnetic film has a magnetically easy axis oriented either perpendicular to a surface of the substrate or at a 0° to 45° angle to a line extending normal to the substrate surface.

13. The magnetic recording media recited in claim 9 wherein the magnetic film satisfies a relationship $Ku_b \geq Ku_a$ in which $Ku_a$ is a magnetic anisotropy constant of one of the magnetic layers located closest to the substrate and $Ku_b$ is a anisotropy constant of one of the magnetic layers located farthest from the substrate.

14. The magnetic recording media recited in claim 9 wherein the magnetic film is fabricated from Co, as a main component, and from materials which include either at least one element or a compound from a group consisting of Cr, Fe, Mo, V, Ta, Pt, Si, B, Ir, W, Hf, Nb, Ru, Ti, Ni, CoO and rare earth elements, or a compound of these elements having a close packed hexagonal (hcp) structure.

15. The magnetic recording media recited in claim 14 wherein an hcp structure a-axis length $a_1$ of one of the magnetic layers located nearest to the substrate and an hcp structure a-axis length $a_2$ of one of the magnetic layers located farthest from the substrate satisfy a relationship $a_2 \geq a_1$.

16. The magnetic recording media recited in claim 9 wherein the thickness of each of the magnetic layers is larger than a crystal grain size in said each magnetic layer.

17. The magnetic recording media recited in claim 9 wherein the non-magnetic layer is fabricated from materials which include either at least one element of a group consisting of elements Co, Ti, Ru, Hf, Ta, Cr, V, W, Mo, Pt, Pd, Si, Ge, and B, or a compound of any of these elements.

18. The magnetic recording media recited in claim 9 wherein the non-magnetic intermediate layer has an hcp, a face centered cubic (fcc), a body centered cubic (bcc) or an amorphous structure.

19. The magnetic recording media recited in claim 9 wherein the non-magnetic intermediate layer has a thickness which lies in a range of $0 < t_m \leq 8$ nm.

20. The magnetic recording media recited in claim 9 wherein a coercivity, $Hc_a$, of one of the magnetic layers located nearest to the substrate and a coercivity, $Hc_b$, of one of the magnetic layers located farthest from the substrate satisfy a relationship $Hc_b \geq Hc_a$.

21. The magnetic recording media recited in claim 9 wherein a saturation magnetization, $Ms_a$, of one of the magnetic films located nearest to the substrate and a saturation magnetization, $Ms_b$, of one of the magnetic layers located farthest from the substrate satisfy a relationship $Ms_b \geq Ms_a$.

22. The magnetic recording media recited in claim 1 wherein the structure control underlayer comprises a plurality of layers successively alternating between a first layer formed of a hexagonal system non-magnetic material and a second layer formed of a body centered cubic (bcc) system non-magnetic material.

23. The magnetic recording media recited in claim 22 wherein the first layer in the underlayer has a preferential c-axis orientation perpendicular to the substrate surface, and the second layer in the underlayer has preferential orientation, of a <110>surface, perpendicular to the substrate surface.

24. The magnetic recording media recited in claim 22 wherein, if magnetic material layers are formed of a hexagonal system magnetic material, one of the layers, which is situated in the underlayer and directly beneath and in contact with the magnetic material layers, is fabricated from the cubic system non-magnetic material.

25. The magnetic recording media recited in claim 24 wherein the hexagonal system non-magnetic material is a hexagonal system non-magnetic film having a c-surface preferentially oriented perpendicular to the substrate surface, and the bcc system magnetic material is a bcc non-magnetic film having a <110> surface preferentially oriented perpendicular to the substrate surface.

26. The magnetic recording media recited in claim 22 wherein the hexagonal system non-magnetic material is made from at least one of the elements from a group consisting of Ti, Zr, Hf and Ru.

27. The magnetic recording media recited in claim 22 wherein the bcc system non-magnetic material is made from at least one of the elements from a group consisting of Cr, Mo, W, V, Nb and Ta.

28. The magnetic recording media recited in claim 22 wherein either of the two magnetic layers is an hexagonal system magnetic alloy film with a longitudinal orientation and made from a Co-based alloy with a Co composition ratio of at least 50%.

29. The magnetic recording media recited in claim 28 wherein the Co-based alloy comprises at least one element from a group consisting of elements Cr, V, Mo, W, Ti, Mn, Re, Sm, Fe and 0, with a composition ratio of the one element, as an atomic percentage of the alloy, of greater than or equal to 0.1% and less than or equal to 25%.

30. The magnetic recording media recited in claim 28 wherein the Co-based alloy comprises at least one element from a group consisting of elements Zr, Ti, Hf, Ta, Ru, Rh, Pd and Pt with a composition ratio of the one element, as an atomic percentage of the alloy, of greater than or equal to 0.1% and less than or equal to 15%.

31. A magnetic recording read-back system having a magnetic recording media, a magnetic head which reads back a recording stored on said media, a driver system which causes relative motion between said media and said magnetic head, and an actuator which determines a position on said magnetic recording media over which the magnetic head should be located, wherein the media comprises:

a non-magnetic substrate;

a magnetic film having at least two magnetic layers separated by a non-magnetic intermediate layer so as to form a stacked set of layers, each of the at least two magnetic layers having a lattice constant, the lattice constants being different from one another; and;

a structure control underlayer situated between the non-magnetic substrate and the magnetic film, wherein at least one of the at least two magnetic layers includes at least two magnetic films, of different lattice constants, which have been epitaxially grown so as to interface each other.

32. The magnetic recording read-back system recited in claim 31 wherein the magnetic layers have different compositions.

33. The magnetic recording read-back system recited in claim 32 wherein the magnetic film and the non-magnetic layer are each epitaxially formed.

34. The magnetic recording read-back system recited in claim 32 wherein the lattice constant of the magnetic film has skew in a same direction as skew in a lattice constant of the structural control underlayer, and a relationship $\Delta L_2 > \Delta L_1$ exists between a lattice constant difference $\Delta L_1$ between the underlayer and one of the magnetic layers located closest to the substrate and a lattice constant difference $\Delta L_2$ between the underlayer and one of the magnetic layers located farthest from the substrate.

35. The magnetic recording read-back system recited in claim 32 wherein the non-magnetic layer is formed from a material having either at least one element from a group of elements consisting of Cr, V, Ti, Ru, W and Mo, or from an alloy containing any of said elements.

36. The magnetic recording read-back system recited in claim 32 wherein the non-magnetic layer has a thickness of 10 nm or less.

37. The magnetic recording read-back system recited in claim 32 wherein the magnetic film is fabricated from Co, as a main component, and from a material which includes at least one element from a group consisting of Cr, Mo, V, Ta, Pt, Si, B, Ir, W, Hf, Nb, Ru, Ti, Ni and rare earth elements.

38. The magnetic recording read-back system recited in claim 32 wherein the thickness of the stacked set of layers is greater than or equal to 5 nm and less than or equal to 30 nm.

39. The magnetic recording read-back system recited in claim 31 wherein the magnetic film satisfies a relationship of $Mr/Ms \geq 0.8$ between saturation magnetization (Ms) and residual magnetization (Mr), to which a demagnetizing field correction is not added, of the magnetic film in a magnetization-magnetic field curve in a magnetically easy axis direction and has an angle ($\theta$) formed by a tangential line, of a magnetic field curve wherein the curve depicts magnetic field strength normalized by coercivity, which passes through a zero magnetization point and a normalized magnetic field axis for the curve in the range of $35° \leq \theta \leq 90°$.

40. The magnetic recording read-back system recited in claim 39 wherein the multi-layer magnetic film and non-magnetic intermediate layer are each epitaxially grown.

41. The magnetic recording read-back system recited in claim 39 further comprising an additional magnetic layer, having permeability in a range of 50 to 1000 or a coercivity of less than 1000 Oe, situated between the structure control underlayer and the substrate.

42. The magnetic recording read-back system recited in claim 39 wherein the magnetic film has a magnetically easy axis oriented either perpendicular to a surface of the substrate or at a 0° to 45° angle to a line extending normal to the substrate surface.

43. The magnetic recording read-back system recited in claim 39 wherein the magnetic film satisfies a relationship $Ku_b \geq Ku_a$ in which $Ku_a$ is a magnetic anisotropy constant of one of magnetic layers located closest to the substrate and $Ku_b$ is a magnetic anisotropy constant of one of the magnetic layers located farthest from the substrate.

44. The magnetic recording read-back system recited in claim 39 wherein the magnetic film is fabricated from Co, as a main component, and from materials which include either at least one element or a compound from a group consisting of Cr, Fe, Mo, V, Ta, Pt, Si, B, Ir, W, Hf, Nb, Ru, Ti, Ni, CoO and rare earth elements, or a compound of these elements having a close packed hexagonal (hcp) structure.

45. The magnetic recording read-back system recited in claim 44 wherein an hcp structure a-axis length $a_1$ of one of the magnetic layers located nearest to the substrate and an hcp structure a-axis length $a_2$ of one of the magnetic layers located farthest from the substrate satisfy a relationship $a_2 \geq a_1$.

46. The magnetic recording read-back system recited in claim 39 wherein the thickness of each of the magnetic layers larger than a crystal grain size in said each magnetic layer.

47. The magnetic recording read-back system recited in claim 39 wherein the non-magnetic layer is fabricated from materials which include either at least one element of a group of elements consisting of Co, Ti, Ru, Hf, Ta, Cr, V, W, Mo, Pt, Pd, Si, Ge and B, or a compound.

48. The magnetic recording read-back system recited in claim 45 wherein the non-magnetic intermediate layer has an hcp, a face centered cubic, a body centered cubic or an amorphous structure.

49. The magnetic recording read-back system recited in claim 39 wherein the non-magnetic intermediate layer has a thickness which lies in a range of $0 < t_m < 8$ nm.

50. The magnetic recording read-back system recited in claim 39 wherein a coercivity, $Hc_a$, of one of the magnetic layers located nearest to the substrate and a coercivity, $Hc_b$, of one of the magnetic layers located farthest from the substrate satisfy a relationship $Hc_b \geq Hc_a$.

51. The magnetic recording read-back system recited in claim 39 wherein a saturation magnetization, $Ms_a$, of one of the magnetic layers located nearest to the substrate and a saturation magnetization, $Ms_b$, of one of the magnetic layers located farthest from the substrate satisfy a relationship $Ms_b \geq Ms_a$.

52. The magnetic recording read-back system recited in claim 31 wherein the structure control underlayer comprises a plurality of layers successively alternating between a first layer formed of a hexagonal system non-magnetic material and a second layer formed of body centered cubic (bcc) system non-magnetic material.

53. The magnetic recording read-back system recited in claim 52 wherein the first layer in the underlayer has a preferential c-axis orientation perpendicular to the substrate surface, and the second layer in the underlayer has preferential orientation, of a <110> surface, perpendicular to the substrate surface.

54. The magnetic recording read-back system recited in claim 52 wherein, if magnetic material layers are formed of a hexagonal system magnetic material, one of the layers, which is situated directly beneath and in contact with the magnetic material layers, is fabricated from the cubic system non-magnetic material.

55. The magnetic recording read-back system recited in claim 54 wherein the hexagonal system non-magnetic material is a hexagonal system non-magnetic film having a c-surface preferentially oriented perpendicular to the substrate surface, and the bcc system magnetic material is a bcc film having a <110> surface preferentially oriented perpendicular to the substrate surface.

56. The magnetic recording read-back system recited in claim 52 wherein the hexagonal system non-magnetic material is fabricated from at least one of the elements from a group consisting of Ti, Zr, Hf and Ru.

57. The magnetic recording read-back system recited in claim 52 wherein the bcc system non-magnetic material is made from at least one of the elements from a group consisting of Cr, Mo, W, V, Nb and Ta.

58. The magnetic recording read-back system recited in claim 52 wherein either of the two magnetic layers is a hexagonal system magnetic alloy film with a longitudinal orientation and made from a Co-based alloy with a Co composition ratio of at least 50%.

59. The magnetic recording read-back system recited in claim 58 wherein the Co-based alloy comprises at least one element from a group consisting of elements Cr, V, Mo, W, Ti, Mn, Re, Sm, Fe and O, and with a composition ratio of the one element, as an atomic percentage of the alloy, greater than or equal to 0.1% and less than or equal to 25%.

60. The magnetic recording read-back system recited in claim 58 wherein the Co-based alloy comprises at least one element from a group consisting of elements Zr, Ti, Hf, Ta, Ru, Rh, Pd and Pt with a composition ratio of the one element, as an atomic percentage of the alloy, of greater than or equal to 0.1% and less than or equal to 15%.

61. The magnetic recording read-back system recited in claim 31 wherein the magnetic recording head comprises an inductive head for writing and a magnetoresistive head for reading, the magnetoresistive head having a magnetoresistive read-back head as a read-back element.

* * * * *